US009773051B2

(12) United States Patent
Smith

(10) Patent No.: US 9,773,051 B2
(45) Date of Patent: Sep. 26, 2017

(54) MOBILE PLATFORM FILE AND FOLDER SELECTION FUNCTIONALITIES FOR OFFLINE ACCESS AND SYNCHRONIZATION

(71) Applicant: Box, Inc., Los Altos, CA (US)

(72) Inventor: Michael Smith, Palo Alto, CA (US)

(73) Assignee: BOX, INC., Redwood City, CA (US)

( * ) Notice: Subject to any disclaimer, the term of this patent is extended or adjusted under 35 U.S.C. 154(b) by 0 days.

(21) Appl. No.: 13/689,544

(22) Filed: Nov. 29, 2012

(65) Prior Publication Data
US 2013/0138608 A1   May 30, 2013

Related U.S. Application Data

(60) Provisional application No. 61/564,425, filed on Nov. 29, 2011, provisional application No. 61/568,430, filed on Dec. 8, 2011.

(51) Int. Cl.
*G06F 17/30* (2006.01)

(52) U.S. Cl.
CPC .. *G06F 17/30575* (2013.01); *G06F 17/30165* (2013.01); *G06F 17/30176* (2013.01); *G06F 17/30197* (2013.01)

(58) Field of Classification Search
CPC ......... G06F 17/30174; G06F 17/30575; G06F 17/30165
USPC ....................................................... 707/610
See application file for complete search history.

(56) References Cited

U.S. PATENT DOCUMENTS

| 858,619 A | 7/1907 | O'Farrell |
|---|---|---|
| 5,043,876 A | 8/1991 | Terry |
| 5,742,905 A | 4/1998 | Pepe et al. |
| 5,748,735 A | 5/1998 | Ganesan |
| 5,774,717 A | 6/1998 | Porcaro |
| 5,787,175 A | 7/1998 | Carter |
| 5,799,320 A | 8/1998 | Klug |
| 5,848,415 A | 12/1998 | Guck |

(Continued)

FOREIGN PATENT DOCUMENTS

| CA | 2724521 | 11/2009 |
|---|---|---|
| CN | 101997924 A | 3/2011 |

(Continued)

OTHER PUBLICATIONS

Kathy Invens, "Using and Troubleshooting Offline Files", Jun. 23, 2002, Windows IT Pro, pp. 1-5.*

(Continued)

*Primary Examiner* — Alexander Khong
(74) *Attorney, Agent, or Firm* — Perkins Coie LLP

(57) ABSTRACT

Systems and methods for folder synchronization and offline synchronization via a mobile platform in a web-based collaboration environment are disclosed. One embodiment includes synchronizing user selected folders and/or sub-folders via the mobile platform, using portable devices including smart phones and tablets using any mobile operating system to allow offline access. Child or sub-folders of the selected folders and/or sub-folders are automatically detected and synchronized for offline access. Any change or new content detected on the client side or on the server side is also synchronized such that the selected folders and/or sub-folders on the client and server sides are up to date.

33 Claims, 23 Drawing Sheets

(56) References Cited

U.S. PATENT DOCUMENTS

| | | |
|---|---|---|
| 5,864,870 A | 1/1999 | Guck |
| 5,926,816 A | 7/1999 | Bauer et al. |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,226,618 B1 | 5/2001 | Downs et al. |
| 6,233,600 B1 | 5/2001 | Salas et al. |
| 6,260,040 B1 | 7/2001 | Kauffman et al. |
| 6,279,109 B1 | 8/2001 | Brundridge |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,446,091 B1 | 9/2002 | Noren et al. |
| 6,449,622 B1 | 9/2002 | LaRue et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,080,104 B2 | 7/2006 | Ring et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,171,468 B2 * | 1/2007 | Yeung ............... H04L 29/06 709/217 |
| 7,178,021 B1 | 2/2007 | Hanna et al. |
| 7,222,078 B2 | 5/2007 | Abelow |
| 7,233,997 B1 | 6/2007 | Leveridge et al. |
| 7,275,244 B1 | 9/2007 | Bell et al. |
| 7,296,025 B2 | 11/2007 | Kung et al. |
| 7,310,684 B2 | 12/2007 | Patrick et al. |
| 7,337,193 B1 | 2/2008 | Mills et al. |
| 7,346,778 B1 | 3/2008 | Guiter et al. |
| 7,353,252 B1 | 4/2008 | Gonzalez et al. |
| 7,362,868 B2 | 4/2008 | Madoukh et al. |
| 7,363,330 B1 | 4/2008 | Ellman et al. |
| 7,370,269 B1 | 5/2008 | Prabhu et al. |
| 7,380,120 B1 * | 5/2008 | Garcia ............... G06F 21/6209 380/200 |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,735,144 B2 | 6/2010 | Pravetz et al. |
| 7,739,411 B2 | 6/2010 | Messer et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,126,848 B2 | 2/2012 | Wagner |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,201,230 B2 | 6/2012 | Day et al. |
| 8,214,747 B1 | 7/2012 | Yankovich et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,447,820 B1 | 5/2013 | Gay |
| 8,458,128 B2 | 6/2013 | Khosravy et al. |
| 8,464,161 B2 | 6/2013 | Giles et al. |
| 8,464,167 B2 | 6/2013 | Saund et al. |
| 8,473,775 B1 | 6/2013 | Helmick et al. |
| 8,515,902 B2 | 8/2013 | Savage |
| 8,527,549 B2 | 9/2013 | Cidon |
| 8,528,087 B2 | 9/2013 | Hsu et al. |
| 8,549,066 B1 | 10/2013 | Donahue et al. |
| 8,549,511 B2 | 10/2013 | Seki et al. |
| 8,572,022 B2 | 10/2013 | Hagan et al. |
| 8,582,777 B2 | 11/2013 | Urivskiy et al. |
| 8,583,619 B2 | 11/2013 | Ghods et al. |
| 8,607,306 B1 | 12/2013 | Bridge et al. |
| 8,650,498 B1 | 2/2014 | Mihovilovic |
| 8,719,445 B2 | 5/2014 | Ko |
| 8,719,810 B2 | 5/2014 | Oh |
| 8,745,267 B2 | 6/2014 | Luecke et al. |
| 8,782,637 B2 | 7/2014 | Khalid |
| 8,819,068 B1 | 8/2014 | Knote et al. |
| 8,825,597 B1 | 9/2014 | Houston et al. |
| 8,849,955 B2 | 9/2014 | Prahlad et al. |
| 8,868,574 B2 | 10/2014 | Kiang et al. |
| 8,869,235 B2 | 10/2014 | Qureshi et al. |
| 8,886,925 B2 | 11/2014 | Qureshi et al. |
| 8,892,679 B1 | 11/2014 | Destagnol et al. |
| 8,914,856 B1 | 12/2014 | Velummylum et al. |
| 8,914,900 B2 | 12/2014 | Smith et al. |
| 8,918,387 B1 | 12/2014 | Sokolov |
| 8,949,179 B2 | 2/2015 | Besen et al. |
| 8,949,939 B2 | 2/2015 | Peddada |
| 8,955,103 B2 | 2/2015 | Kline, III et al. |
| 8,966,062 B1 | 2/2015 | Giese et al. |
| 8,990,307 B2 | 3/2015 | Barreto et al. |
| 8,990,955 B2 | 3/2015 | Hymel et al. |
| 9,015,248 B2 | 4/2015 | Barreto et al. |
| 9,019,123 B2 | 4/2015 | Boulanger et al. |
| 9,054,919 B2 | 6/2015 | Kiang et al. |
| 9,213,684 B2 | 12/2015 | Lai et al. |
| 9,239,846 B2 | 1/2016 | Besen et al. |
| 9,244,934 B2 | 1/2016 | Besen et al. |
| 9,268,655 B2 | 2/2016 | Chan et al. |
| 9,396,216 B2 | 7/2016 | Barreto et al. |

(56) References Cited

U.S. PATENT DOCUMENTS

| | | |
|---|---|---|
| 9,396,245 B2 | 7/2016 | Mackenzie et al. |
| 9,407,664 B1 | 8/2016 | Banerjee |
| 9,495,434 B1 | 11/2016 | Walton et al. |
| 9,507,795 B2 | 11/2016 | Dorman et al. |
| 9,535,924 B2 | 1/2017 | Mackenzie et al. |
| 9,547,658 B2 | 1/2017 | Fan et al. |
| 9,553,758 B2 | 1/2017 | Rexer |
| 9,558,202 B2 | 1/2017 | Lockhart et al. |
| 9,563,517 B1 | 2/2017 | Natanzon et al. |
| 9,575,981 B2 | 2/2017 | Dorman et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0073448 A1 | 4/2003 | Ozeki et al. |
| 2003/0084306 A1 | 5/2003 | Abburi et al. |
| 2003/0093404 A1 | 5/2003 | Bader et al. |
| 2003/0097374 A1 | 5/2003 | Himeno |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0003104 A1 | 1/2004 | Boskovic et al. |
| 2004/0021686 A1 | 2/2004 | Barberis |
| 2004/0076187 A1 | 4/2004 | Peled |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0162836 A1 | 8/2004 | Aronoff et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1* | 10/2004 | Kraenzel et al. ............. 345/700 |
| 2004/0218214 A1 | 11/2004 | Kihara et al. |
| 2004/0230624 A1 | 11/2004 | Frolund et al. |
| 2004/0230652 A1 | 11/2004 | Estrada et al. |
| 2004/0246532 A1 | 12/2004 | Inada |
| 2004/0260977 A1 | 12/2004 | Ji et al. |
| 2004/0267825 A1 | 12/2004 | Novak et al. |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022175 A1 | 1/2005 | Sliger et al. |
| 2005/0022229 A1 | 1/2005 | Gabriel et al. |
| 2005/0028006 A1 | 2/2005 | Leser et al. |
| 2005/0033777 A1 | 2/2005 | Moraes et al. |
| 2005/0038997 A1 | 2/2005 | Kojima et al. |
| 2005/0050228 A1 | 3/2005 | Perham et al. |
| 2005/0055306 A1 | 3/2005 | Miller et al. |
| 2005/0063083 A1 | 3/2005 | Dart et al. |
| 2005/0097061 A1* | 5/2005 | Shapiro ............... G06F 21/6209 705/67 |
| 2005/0097225 A1* | 5/2005 | Glatt ................... H04L 67/1095 709/248 |
| 2005/0097434 A1 | 5/2005 | Storisteanu |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0172284 A1 | 8/2005 | Dandekar et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0117247 A1 | 6/2006 | Fite et al. |
| 2006/0123062 A1 | 6/2006 | Bobbitt et al. |
| 2006/0168550 A1 | 7/2006 | Muller et al. |
| 2006/0173952 A1 | 8/2006 | Coyle |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0011469 A1 | 1/2007 | Allison et al. |
| 2007/0016680 A1 | 1/2007 | Burd et al. |
| 2007/0028291 A1 | 2/2007 | Brennan et al. |
| 2007/0038934 A1 | 2/2007 | Fellman |
| 2007/0067349 A1 | 3/2007 | Jhaveri et al. |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0142039 A1 | 6/2007 | Bushnell et al. |
| 2007/0157203 A1 | 7/2007 | Lim |
| 2007/0162610 A1 | 7/2007 | Un et al. |
| 2007/0179993 A1 | 8/2007 | Arruza |
| 2007/0185885 A1 | 8/2007 | Tamura |
| 2007/0195779 A1 | 8/2007 | Judge et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0040560 A1 | 2/2008 | Hall et al. |
| 2008/0046828 A1 | 2/2008 | Bibliowicz et al. |
| 2008/0059474 A1 | 3/2008 | Lim |
| 2008/0059656 A1 | 3/2008 | Saliba et al. |
| 2008/0060080 A1 | 3/2008 | Lim |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |

(56) References Cited

U.S. PATENT DOCUMENTS

| | | |
|---|---|---|
| 2008/0091790 A1 | 4/2008 | Beck |
| 2008/0104277 A1 | 5/2008 | Tian |
| 2008/0114720 A1* | 5/2008 | Smith ............... G06F 17/30578 |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0195673 A1 | 8/2008 | Hamel et al. |
| 2008/0215883 A1 | 9/2008 | Fok et al. |
| 2008/0222654 A1 | 9/2008 | Xu et al. |
| 2008/0243846 A1 | 10/2008 | Rasmussen |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2008/0306900 A1 | 12/2008 | Tamura |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0172201 A1 | 7/2009 | Carmel |
| 2009/0177754 A1 | 7/2009 | Brezina et al. |
| 2009/0193107 A1* | 7/2009 | Srinivasan ........ G06F 17/30132 709/223 |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | FitzGerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082396 A1 | 4/2010 | Caldwell et al. |
| 2010/0082534 A1 | 4/2010 | Sagar et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0122184 A1 | 5/2010 | Vonog et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0154025 A1 | 6/2010 | Balducci et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205392 A1 | 8/2010 | Schnapp et al. |
| 2010/0205537 A1 | 8/2010 | Knighton et al. |
| 2010/0212010 A1 | 8/2010 | Stringer et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0242028 A1 | 9/2010 | Weigert |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1* | 10/2010 | Garcia-Ascanio et al. .. 707/634 |
| 2010/0262953 A1 | 10/2010 | Barboni et al. |
| 2010/0267588 A1 | 10/2010 | Nelson et al. |
| 2010/0269164 A1 | 10/2010 | Sosnosky et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0312615 A1 | 12/2010 | Murphy et al. |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332818 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0078243 A1 | 3/2011 | Carpenter et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0131299 A1 | 6/2011 | Sardary |

(56) References Cited

U.S. PATENT DOCUMENTS

| | | |
|---|---|---|
| 2011/0137991 A1 | 6/2011 | Russell |
| 2011/0138479 A1 | 6/2011 | Jain et al. |
| 2011/0142410 A1 | 6/2011 | Ishii |
| 2011/0145187 A1 | 6/2011 | Himmelsbach et al. |
| 2011/0145282 A1 | 6/2011 | Moore et al. |
| 2011/0145744 A1 | 6/2011 | Haynes et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0218964 A1 | 9/2011 | Hagan et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1* | 9/2011 | Agrawal .................. 707/610 |
| 2011/0238759 A1 | 9/2011 | Spataro et al. |
| 2011/0239135 A1* | 9/2011 | Spataro .................. G06Q 10/10 715/753 |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252312 A1 | 10/2011 | Lemonik et al. |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0264621 A1 | 10/2011 | Burjoski |
| 2011/0276683 A1 | 11/2011 | Goldschlag et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0295798 A1 | 12/2011 | Shain |
| 2011/0296022 A1 | 12/2011 | Ferris et al. |
| 2011/0313803 A1 | 12/2011 | Friend et al. |
| 2011/0314145 A1 | 12/2011 | Raleigh et al. |
| 2011/0320197 A1 | 12/2011 | Conejero et al. |
| 2011/0320936 A1 | 12/2011 | Mohan et al. |
| 2012/0030187 A1 | 2/2012 | Marano et al. |
| 2012/0036370 A1 | 2/2012 | Lim et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089610 A1 | 4/2012 | Agrawal et al. |
| 2012/0089710 A1 | 4/2012 | Rakowski et al. |
| 2012/0092055 A1 | 4/2012 | Peschke et al. |
| 2012/0096521 A1 | 4/2012 | Peddada |
| 2012/0101995 A1 | 4/2012 | Agetsuma et al. |
| 2012/0108200 A1 | 5/2012 | Rubin et al. |
| 2012/0110005 A1 | 5/2012 | Kuo et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0143825 A1 | 6/2012 | Boehm et al. |
| 2012/0144283 A1 | 6/2012 | Hill et al. |
| 2012/0150888 A1 | 6/2012 | Hyatt et al. |
| 2012/0151265 A1 | 6/2012 | Bender et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0206653 A1 | 8/2012 | Graves et al. |
| 2012/0207449 A1 | 8/2012 | Angquist et al. |
| 2012/0209815 A1 | 8/2012 | Carson et al. |
| 2012/0209889 A1 | 8/2012 | Agnoli et al. |
| 2012/0214444 A1 | 8/2012 | McBride et al. |
| 2012/0216242 A1 | 8/2012 | Uner et al. |
| 2012/0218885 A1 | 8/2012 | Abel et al. |
| 2012/0221789 A1 | 8/2012 | Felter |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0311499 A1 | 12/2012 | Dellinger et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0054634 A1 | 2/2013 | Chakraborty et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0073621 A1 | 3/2013 | Waddoups et al. |
| 2013/0080765 A1 | 3/2013 | Mohanty et al. |
| 2013/0080919 A1 | 3/2013 | Kiang et al. |
| 2013/0110565 A1 | 5/2013 | Means, Jr. et al. |
| 2013/0110961 A1 | 5/2013 | Jadhav |
| 2013/0117226 A1 | 5/2013 | Jain et al. |
| 2013/0117337 A1 | 5/2013 | Dunham |
| 2013/0117376 A1 | 5/2013 | Filman et al. |
| 2013/0124458 A1 | 5/2013 | Barreto et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0151690 A1 | 6/2013 | Shah et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0179947 A1 | 7/2013 | Kline, III et al. |
| 2013/0185347 A1 | 7/2013 | Romano |
| 2013/0185452 A1 | 7/2013 | Burckart et al. |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0219176 A1 | 8/2013 | Akella et al. |
| 2013/0226876 A1 | 8/2013 | Gati et al. |
| 2013/0227522 A1 | 8/2013 | Lerum et al. |

(56) References Cited

U.S. PATENT DOCUMENTS

| | | |
|---|---|---|
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0254699 A1 | 9/2013 | Bashir et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0268999 A1 | 10/2013 | Kiang et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282658 A1 | 10/2013 | Besen et al. |
| 2013/0282830 A1 | 10/2013 | Besen et al. |
| 2013/0283106 A1 | 10/2013 | King et al. |
| 2013/0304679 A1 | 11/2013 | Fleming et al. |
| 2013/0304694 A1 | 11/2013 | Barreto et al. |
| 2013/0304697 A1 | 11/2013 | Movida |
| 2013/0305039 A1 | 11/2013 | Gauda |
| 2013/0325803 A1 | 12/2013 | Akirav et al. |
| 2013/0326344 A1 | 12/2013 | Masselle et al. |
| 2014/0006357 A1 | 1/2014 | Davis et al. |
| 2014/0006465 A1 | 1/2014 | Davis et al. |
| 2014/0007205 A1 | 1/2014 | Oikonomou |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0033324 A1 | 1/2014 | Kiang et al. |
| 2014/0040182 A1 | 2/2014 | Gilder et al. |
| 2014/0040206 A1 | 2/2014 | Ramakrishnan et al. |
| 2014/0047509 A1 | 2/2014 | Bhogal et al. |
| 2014/0052939 A1 | 2/2014 | Tseng et al. |
| 2014/0059002 A1 | 2/2014 | Lockhart et al. |
| 2014/0059217 A1 | 2/2014 | Pizurica |
| 2014/0068589 A1 | 3/2014 | Barak |
| 2014/0074629 A1 | 3/2014 | Rathod |
| 2014/0149461 A1 | 5/2014 | Wijayaratne et al. |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0172799 A1 | 6/2014 | Dorman |
| 2014/0188798 A1 | 7/2014 | Mackenzie et al. |
| 2014/0195485 A1 | 7/2014 | Dorman |
| 2014/0201138 A1 | 7/2014 | Dorman et al. |
| 2014/0201145 A1 | 7/2014 | Dorman et al. |
| 2014/0215303 A1 | 7/2014 | Grigorovitch et al. |
| 2014/0223423 A1 | 8/2014 | Alsina et al. |
| 2014/0230011 A1 | 8/2014 | Drewry et al. |
| 2014/0244600 A1 | 8/2014 | Schmidt et al. |
| 2014/0258350 A1 | 9/2014 | Duval et al. |
| 2014/0280605 A1 | 9/2014 | Zhang |
| 2014/0337291 A1 | 11/2014 | Dorman et al. |
| 2014/0337482 A1 | 11/2014 | Houston et al. |
| 2014/0337491 A1 | 11/2014 | Barreto et al. |
| 2014/0344456 A1 | 11/2014 | Buzbee et al. |
| 2014/0359085 A1 | 12/2014 | Chen |
| 2014/0359286 A1 | 12/2014 | Wen et al. |
| 2014/0372376 A1 | 12/2014 | Smith et al. |
| 2014/0379647 A1 | 12/2014 | Smith et al. |
| 2014/0379760 A1 | 12/2014 | Martin et al. |
| 2015/0019723 A1 | 1/2015 | Kweon et al. |
| 2015/0039556 A1 | 2/2015 | Mackenzie et al. |
| 2015/0154156 A1 | 6/2015 | Meyers, Jr. et al. |
| 2015/0186668 A1 | 7/2015 | Whaley et al. |
| 2015/0237406 A1 | 8/2015 | Ochoa et al. |
| 2015/0339113 A1 | 11/2015 | Dorman et al. |
| 2016/0065672 A1 | 3/2016 | Savage et al. |
| 2016/0350326 A1 | 12/2016 | Simonetti |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2006250944 | 10/2008 |
| KR | 20020017444 A | 3/2002 |
| KR | 20040028036 | 4/2004 |
| KR | 20050017674 | 2/2005 |
| KR | 20060070306 A | 6/2006 |
| KR | 20060114871 A | 11/2006 |
| KR | 20070043353 | 4/2007 |
| KR | 20070100477 | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 | 11/2004 |
| WO | WO-2006028850 A2 | 3/2006 |
| WO | WO-2007024438 A1 | 3/2007 |
| WO | WO-2007035637 A2 | 3/2007 |
| WO | 2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

Kathy Invens, "Using and Troubleshooting Offline Files", Jun. 23, 2002, Windows IT Pro, Figure 1 and 2.*
Kathy Ivens, "Using and Troubleshooting Offline Files", Jun. 23, 2002, Windows IT Pro, pp. 1-3.*
Kathy Ivens, "Using and Troubleshooting Offline Files", Jun. 23, 2002, Windows IT Pro, Figure 1.*
Kathy Ivens, "Configuring Offline Files", Apr. 21, 2002, Windows IT Pro, pp. 1-3.*
Cicnavi, "Offline Files in XP", Nov. 29, 2010, UtilizeWindows, pp. 1-6.*
"Understanding Metadata," National Information Standards Organization, NISO Press, 2004, 20 pages.
International Search Report and Written Opinion for PCT/US2012/056955, Applicant: Box, Inc., Mailed Mar. 27, 2013, pp. 1-11.
International Search Report and Written Opinion for PCT/US2011/047530, Applicant: Box, Inc., Mailed Mar. 22, 2013, pp. 1-10.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/063041, Applicant: Box, Inc., Mailed Mar. 29, 2013, 12 pages.
International Search Report and Written Opinion for PCT/US2011/057938, Applicant: Box, Inc., Mailed Mar. 29, 2013, 10 pages.
Parr, "Google Docs Improves Commenting, Adds E-mail Notifications," Apr. 16, 2011, mashable.com, pp. 1-6.
"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine.com, pp. 1-32.

(56) References Cited

OTHER PUBLICATIONS

"Average Conversion Time for a D60 RAW file?" http://www.dpreview.com, Jul. 22, 2002, 4 pages.
Burns, "Developing Secure Mobile Applications for Android," Oct. 2008, Version 1.0, 1-28 pages.
Comes, "MediaXchange User's Manual," Version 1.15.15, Feb. 1, 2009, pp. 1-90.
Exam Report for GB1308842.2, Applicant: Box, Inc. Mailed Mar. 10, 2014, 4 pages.
Exam Report for GB1312264.3, Applicant: Box, Inc. Mailed Mar. 24, 2014, 7 pages.
Exam Report for GB1314771.5, Applicant: Box, Inc. Mailed Feb. 17, 2014, 7 pages.
Search Report for EP 11729851.3, Applicant: Box, Inc. Mailed Feb. 7, 2014, 9 pages.
Search Report for EP14153783.7, Applicant: Box, Inc. Mailed Mar. 24, 2014, 7 pages.
John et al., "Always Sync Support Forums—View topic—Allway sync funny behavior," Allway Sync Support Forum at http://sync-center.com, Mar. 28, 2011, XP055109680, 2 pages.
Search Report for EP14151588.2, Applicant: Box, Inc. Mailed Apr. 15, 2014, 12 pages.
U.S. Appl. No. 60/992,656, filed Dec. 5. 2007 Methods and Systems for Open Source Collaboration in an Application Service Provider Environment.
U.S. Appl. No. 61/055,901, filed May 23, 2008 Methods and Systems for Open Source Integration.
U.S. Appl. No. 13/412,549, filed Mar. 5, 2012 Methods and Systems for Open Source Collaboration in an Application Service Provider Environment.
U.S. Appl. No. 13/646,339, filed Oct. 5, 2012 File Management System and Collaboration Service and Integration Capabilities With Third Party Applications.
U.S. Appl. No. 14/073,502, filed Nov. 6, 2013 Methods and Systems for Open Source Collaboration in an Application Service Provider Environment.
U.S. Appl. No. 61/434,810, filed Jan. 20, 2011 Real Time Notifications of Activity and Real-Time Collaboration in a Cloud-Based Environment With Applications in Enterprise Settings.
U.S. Appl. No. 13/152,982, filed Jun. 3, 2011 Real Time Notification of Activities that Occur in a Web-Based Collaboration Environment.
U.S. Appl. No. 13/166,733, filed Jun. 22, 2011 Multimedia Content Preview Rendering in a Cloud Content Management System.
U.S. Appl. No. 61/551,894, filed Oct. 26, 2011 Enhanced Multimedia Content Preview Rendering in a Cloud Content Management System.
U.S. Appl. No. 13/590,012, filed Aug. 20, 2012 Preview Pre-Generation Based on Heuristics and Algorithmic Prediction/Assessment of Predicted User Behavior for Enhancement of User Experience.
U.S. Appl. No. 13/297,230, filed Nov. 15, 2011 Enhanced Multimedia Content Preview Rendering in a Cloud Content Management.
U.S. Appl. No. 61/592,567, filed Jan. 30, 2012 Preview Pre-Generation Based on Heuristics and Algorithmic Prediction/Assessment of Predicted User Behavior for Enhancement of User Experience.
U.S. Appl. No. 61/506,013, filed Jul. 8, 2011 Collaboration Sessions in a Workspace on a Cloud-Based Content Management System.
U.S. Appl. No. 13/208,615, filed Aug. 12, 2011 Collaboration Sessions in a Workspace on a Cloud-Based Content Management System.
U.S. Appl. No. 61/592,394, filed Jan. 30, 2012 Extended Applications of Multimedia Content Previews in the Cloud-Based Content Management System.
U.S. Appl. No. 13/588,536, filed Aug. 17, 2012 Extended Applications of Multimedia Content Previews in the Cloud-Based Content Management System.
U.S. Appl. No. 13/274,268, filed Oct. 14, 2011 Automatic and Semi-Automatic Tagging Features of Work Items in a Shared Workspace for Metadata Tracking in a Cloud-Based Content Management System With Selective or Optional User Contribution.
U.S. Appl. No. 13/968,357, filed Aug. 15, 2013 Automatic and Semi-Automatic Tagging Features of Work Items in a Shared Workspace for Metadata Tracking in a Cloud-Based Content Management System With Selective or Optional User Contribution.
U.S. Appl. No. 61/538,782, filed Sep. 23, 2011 Central Management and Control of User-Contributed Content in a Web-Based Collaboration Environment and Management Console Thereof.
U.S. Appl. No. 13/547,264, filed Jul. 12, 2012 Central Management and Control of User-Contributed Content in a Web-Based Collaboration Environment and Management Console Thereof.
U.S. Appl. No. 13/165,725, filed Jun. 21, 2011 Batch Uploading of Content to a Web-Based Collaboration Environment.
U.S. Appl. No. 61/554,450, filed Nov. 1, 2011 Platform and Application Independent Method for Document Editing and Version Tracking Via a Web Browser.
U.S. Appl. No. 13/332,319, filed Dec. 20, 2011 Platform and Application Independent System and Method for Networked File Access and Editing.
U.S. Appl. No. 13/414,480, filed Mar. 7, 2012 Universal File Type Preview for Mobile Devices.
U.S. Appl. No. 13/345,502, filed Jan. 6, 2012 System and Method for Actionable Event Generation for Task Delegation and Management Via a Discussion Forum in a Web-Based Collaboration Environment.
U.S. Appl. No. 13/619,439, filed Sep. 14, 2012 Batching Notifications of Activities That Occur in a Web-Based Collaboration Environment.
U.S. Appl. No. 61/560,685, filed Nov. 16, 2011 Temporal and Spatial Processing and Tracking of Events in a Web-Based Collaboration Enviroment for Asynchronous Delivery in an Ordered Fashion.
U.S. Appl. No. 61/579,551, filed Dec. 22, 2011 System Status Monitoring and Data Health Checking in a Collaborative Environment.
U.S. Appl. No. 13/464,813, filed Apr. 4, 2012 Health Check Services for Web- Based Collaboration Environments.
U.S. Appl. No. 13/405,164, filed Feb. 24, 2012 System and Method for Promoting Enterprise Adoption of a Web-Based Collaboration Environment.
U.S. Appl. No. 13/431,645, filed Mar. 27, 2012 Cloud Service or Storage Use Promotion Via Partnership Driven Automatic Account Upgrades.
U.S. Appl. No. 61/649,869, filed Mar. 21, 2012 Selective Application Access Control Via a Cloud-Based Service for Security Enhancement.
U.S. Appl. No. 13/493,783, filed Jun. 11, 2012 Security Enhancement Through Application Access Control.
U.S. Appl. No. 61/702,948, filed Sep. 19, 2012 Cloud-Based Platform Enabled With Media Content Indexed for Text-Based Searches and/or Metadata Extraction.
U.S. Appl. No. 13/829,663, filed Mar. 14, 2013 Cloud-Based Platform Enabled With Media Content Indexed for Text-Based Searches and/or Metadata Extraction.
U.S. Appl. No. 14/010,851, filed Aug. 27, 2013 Server Side Technique for Reducing Database Workload in Implementing Selective Subfolder Synchronization in a Cloud-Based Environment.
U.S. Appl. No. 61/641,824, filed May 2, 2013 Platform and Application Agnostic Method for Seamless File Access in a Mobile Environment.
U.S. Appl. No. 61/650,840, filed May 2, 2012 Platform and Application Agnostic Method for Seamless File Access in a Mobile Environment.
U.S. Appl. No. 61/653,876, filed May 31, 2012 Platform and Application Agnostic Method for Seamless File Access in a Mobile Environment.
U.S. Appl. No. 13/886,147, filed May 2, 2013 System and Method for a Third- Party Application to Access Content Within a Cloud-Based Platform.
U.S. Appl. No. 13/897,421, filed May 19, 2013 Methods, Architectures and Security Mechanisms for a Third-Party Application to Access Content in a Cloud-Based Platform.

(56) References Cited

OTHER PUBLICATIONS

U.S. Appl. No. 13/898,200, filed May 20, 2013 Metadata Enabled Third-Party Application Access of Content at a Cloud-Based Platform Via a Native Client to the Cloud-Based Platform.
U.S. Appl. No. 13/898,242, filed May 20, 2013 Identification Verification Mechanisms for a Third-Party Application to Access Content in a Cloud-Based Platform.
U.S. Appl. No. 61/667,909, filed Jul. 3, 2012 Highly Available Ftp Servers for a Cloud-Based Service.
U.S. Appl. No. 13/565,136, filed Aug. 2, 2012 Load Balancing Secure Ftp Connections Among Multiple Ftp Servers.
U.S. Appl. No. 13/649,784, filed Oct. 11, 2012 Highly Available Ftp Servers for a Cloud-Based Service.
U.S. Appl. No. 61/668,626, filed Jul. 6, 2012 Online Shard Migration.
U.S. Appl. No. 13/937,060, filed Jul. 8, 2013 System and Method for Performing Shard Migration to Support Functions of a Cloud-Based Service.
U.S. Appl. No. 61/668,698, filed Jul. 6, 2012 Identification of People as Search Results From Key-Word Based Searches of Content in a Cloud-Based Environment.
U.S. Appl. No. 13/937,101, filed Jul. 8, 2013 Identification of People as Search Results From Key-Word Based Searches of Content in a Cloud-Based Environment.
U.S. Appl. No. 61/668,791, filed Jul. 6, 2012 Systems and Methods for Specifying User and Item Identifiers Within an Email Address for Securely Submitting Comments Via Email.
U.S. Appl. No. 13/937,124, filed Jul. 8, 2013 Systems and Methods for Securely Submitting Comments Among Users Via External Messaging Applications in a Cloud-Based Platform.
U.S. Appl. No. 61/673,671, filed Jul. 19, 2012 Data Loss Prevention Methods and Architectures in a Cloud Service.
U.S. Appl. No. 13/944,184, filed Jul. 17, 2013 Data Loss Prevention (DLP) Methods and Architectures by a Cloud Service.
U.S. Appl. No. 13/944,241, filed Jul. 17, 2013 Data Loss Prevention (DLP) Methods by a Cloud Service Including Third Party Integration Architectures.
U.S. Appl. No. 61/694,492, filed Aug. 29, 2012 Method of Streaming File Encryption and Decryption to/From a Collaborative Cloud.
U.S. Appl. No. 13/975,827, filed Aug. 26, 2013 Method of Streaming File Encryption and Decryption to/From a Collaborative Cloud.
U.S. Appl. No. 61/701,823, filed Sep. 17, 2012 Use of a Status Bar Interface Element as a Handle for Revealing Additional Details.
U.S. Appl. No. 13/737,577, filed Jan. 9, 2013 System and Method of a Manipulative Handle in an Interactive Mobile User Interface.
U.S. Appl. No. 61/697,437, filed Sep. 6, 2012 Secure File Portability Between Mobile Applications Using a Server-Based Key Generation Service.
U.S. Appl. No. 13/776,358, filed Feb. 25, 2013 Secure File Portability Between Mobile Applications Using a Server-Based Key Generation Service.
U.S. Appl. No. 61/697,469, filed Sep. 6, 2012 Force Upgrade of a Mobile Application Via Server Side Configuration Files.
U.S. Appl. No. 13/776,467, filed Feb. 25, 2013 Force Upgrade of a Mobile Application Via Server Side Configuration File.
U.S. Appl. No. 61/697,477, filed Sep. 6, 2012 Disabling the Self-Referential Appearance of a Mobile Application in an Intent Via a Background Registration.
U.S. Appl. No. 13/794,401, filed Mar. 11, 2013 Disabling the Self-Referential Appearance of a Mobile Application in an Intent Via a Background Registration.
U.S. Appl. No. 61/697,511, filed Sep. 6, 2012 Channel for Opening and Editing Files From a Cloud Service Provider Based on Intents.
U.S. Appl. No. 13/776,535, filed Feb. 25, 2013 System and Method for Creating a Secure Channel for Inter-Application Communication Based on Intents.
U.S. Appl. No. 61/694,466, filed Aug. 12, 2012 Optimizations for Client and/or Server Feedback Information Enabled Real Time or Near Real Time Enhancement of Upload/Download Performance.
U.S. Appl. No. 61/702,154, filed Sep. 17, 2012 Optimizations for Client and/or Server Feedback Information Enabled Real Time or Near Real Time Enhancement of Upload/Download Performance.
U.S. Appl. No. 61/703,699, filed Sep. 20, 2012 Optimizations for Client and/or Server Feedback Information Enabled Real Time or Near Real Time Enhancement of Upload/Download Performance.
U.S. Appl. No. 13/969,474, filed Aug. 16, 2013 Client-Server Fast Upload and Download Feedback Optimizers.
U.S. Appl. No. 61/751,578, filed Jan. 11, 2013 Functionalities, Features, and User Interface of a Synchronization Client to a Cloud-Based Environment.
U.S. Appl. No. 61/715,208, filed Oct. 17, 2012 Adaptive Architectures for Encryption Key Management in a Cloud-Based Environment.
U.S. Appl. No. 14/056,899, filed Oct. 17, 2013 Remote Key Management in a Cloud-Based Environment.
U.S. Appl. No. 61/709,086, filed Oct. 2, 2012 Visibility, Access Control, Advanced Reporting Api, and Enhanced Data Protection and Security Mechanisms for Administrators in an Enterprise.
U.S. Appl. No. 14/044,261, filed Oct. 2, 2013 System and Method for Enhanced Security and Management Mechanisms for Enterprise Administrators in a Cloud-Based Environment.
U.S. Appl. No. 61/709,653, filed Oct. 4, 2012 Corporate User Discovery and Identification of Recommended Collaborators in a Cloud Platform.
U.S. Appl. No. 14/046,294, filed Oct. 4, 2013 Corporate User Discovery and Identification of Recommended Collaborators in a Cloud Platform.
U.S. Appl. No. 61/709,866, filed Oct. 4, 2012 Enhanced Quick Search Features, Low-Barrier Commenting/Interactive Features in a Collaboration Platform.
U.S. Appl. No. 14/046,523, filed Oct. 4, 2013 Enhanced Quick Search Features, Low-Barrier Commenting/Interactive Features in a Collaboration Platform.
U.S. Appl. No. 61/709,407, filed Oct. 4, 2012 Seamless Access, Editing, and Creation of Files in a Web Interface or Mobile Interface to a Cloud Platform.
U.S. Appl. No. 14/046,726, filed Oct. 4, 2013 Seamless Access, Editing, and Creation of Files in a Web Interface or Mobile Interface to a Cloud Platform.
U.S. Appl. No. 61/710,182, filed Oct. 5, 2012 Embedded Html Folder Widget for Accessing a Cloud Collaboration Platform and Content From Any Site.
U.S. Appl. No. 14/047,223, filed Oct. 7, 2013 System and Method for Generating Embeddable Widgets Which Enable Access to a Cloud-Based Collaboration Platform.
U.S. Appl. No. 13/953,668. filed Jul. 29, 2013 System and Method for Advanced Search and Filtering Mechanisms for Enterprise Administrators in a Cloud-Based Environment.
U.S. Appl. No. 14/026,674, filed Sep. 13, 2013 Configurable Event-Based Automation Architecture for Cloud-Based Collaboration Platforms.
U.S. Appl. No. 61/877,917, filed Sep. 13, 2013 Systems and Methods for Configuring Event-Based Automation in Cloud-Based Collaboration Platforms.
U.S. Appl. No. 14/075,849, filed Nov. 8, 2013 Systems and Methods for Configuring Event-Based Automation in Cloud-Based Collaboration Platforms.
U.S. Appl. No. 14/027,149, filed Sep. 13, 2013 Simultaneous Editing/Accessing of Content by Collaorator Invitation Through a Web-Based or Mobile Application to a Cloud-Based Collaboration Platform.
U.S. Appl. No. 14/042,473, filed Sep. 30, 2013 Simultaneous Editing/Accessing of Content by Collaorator Invitation Through a Web-Based or Mobile Application to a Cloud-Based Collaboration Platform.
U.S. Appl. No. 14/026,837, filed Sep. 13, 2013 Mobile Device Methods and User Interfaces Thereof in a Mobile Device Platform Featuring Multifunctional Access and Engagement in a Collaborative Environment Provided by a Cloud-Based Platform.
U.S. Appl. No. 14/027,147, filed Sep. 13, 2013 System and Method for Rendering Document in Web Browser or Mobile Device Regardless of Third-Party Plug-In Software

(56) References Cited

OTHER PUBLICATIONS

"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
Exam Report for EP13158415.3, Applicant: Box, Inc. Mailed Jun. 4, 2013, 8 pages.
Exam Report for GB1300188.8, Applicant: Box, Inc. Mailed May 31, 2013, 8 pages.
Exam Report for GB1306011.6, Applicant: Box, Inc. Mailed Apr. 18, 2013, 8 pages.
International Search Report and Written Opinion for PCT/US2010/070366, Applicant: Box, Inc., Mailed Mar. 24, 2013, 10 pages.
International Search Report and Written Opinion for PCT/US2013/020267, Applicant: Box, Inc., Mailed May 7, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/029520, Applicant: Box, Inc., Mailed Jun. 26, 2013, 10 pages.
International Search Report and Written Opinion for PCT/US2013/034662, Applicant: Box, Inc., Mailed May 31, 2013, 10 pages.
International Search Report and Written Opinion for PCT/US2013/035404, Applicant: Box, Inc., Mailed Jun. 26, 2013, 13 pages.
International Search Report and Written Opinion for PCT/US2013/039782, Applicant: Box, Inc., Mailed Aug. 28, 2013, 15 pages.
Exam Report for GB1313559.5, Applicant: Box, Inc., Mailed Aug. 22, 2013, 19 pages.
International Search Report and Written Opinion for PCT/US2008/012973 dated Apr. 30, 2009, pp. 1-11.
International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/056472 mailed on Jun. 22, 2012, pp. 1-12.
International Search Report and Written Opinion for PCT/US2011/060875 Mailed Oct. 30, 2012, pp. 1-10.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Conner, "Google Apps: The Missing Manual," published by O'Reilly Media, May 27, 2008, 24 pages.
Cisco, "FTP Load Balancing on ACE in Routed Mode Configuration Example," DocWiki, Jun. 2011, 7 pages.
Palmer, "Load Balancing FTP Servers," BlogNav, Oct. 2008, 2 pages.
Wayback, "Wayback machine," Wayback, Jun. 1, 2011, 1 page.
"PaperPort Professional 14," PC Mag. com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.

Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Gedymin, "Cloud computing with an emphasis on Google App Engine," Master Final Project, Sep. 2011, 146 pages.
Google Docs,http://web.Archive.org/web/20100413105758/http://en.wikipedia.org/wiki/Google_docs, Apr. 13, 2010, 6 pages.
Exam Report for EP13168784.0, Applicant: Box, Inc. Mailed Nov. 21, 2013, 7 pages.
Exam Report for EP13185269.1, Applicant: Box, Inc. Mailed Jan. 28, 7 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
International Search Report and Written Opinion for PCT/US2013/034765, Applicant: Box, Inc., Mailed Jan. 20, 2014, 15 pages.
Patent Court Document of Approved Judgment for GB0602349.3 and GB0623571.7; Mar. 3, 2009, 17 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Search Report for EP 13189144.2 Applicant: Box, Inc. Mailed Sep. 1, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.

(56) References Cited

OTHER PUBLICATIONS

Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. Mailed May 26, 2014, 6 pages.
Exam Report for GB1318792.7, Applicant: Box, Inc. Mailed May 22, 2014, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Exam Report for GB1410569.6 Applicant: Box, Inc. Mailed Jul. 11, 2014, 9 pages.
Sommerer, "Presentable Document Format: Improved On-demand PDF to HTML Conversion," retrieved from the internet, http://research.microsoft.com, Nov. 2004, 8 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc. Mailed Feb. 17, 2015, 5 pages.
Exam Report for EP 13185269.1, Applicant: Box, Inc. Mailed Feb. 13, 2015, 8 pages.
Exam Report for GB1311459.0 Applicant: Box, Inc. Mailed Aug. 19, 2013, 6 pages.
"Dropbox: Sync only specific folders," posted on Feb. 9, 2012, available online at http://www.tech-recipes.com/rx/20865/dropbox-sync-only-specific-folders/, 4 pages.
Exam Report for GB1220644.7 Applicant: Box, Inc. Mailed May 1, 2015, 4 pages.
"How-to Geek, How to Sync Specific Folders With Dropbox," originally written on Jun. 20, 2010 and archived version retrieved from WaybackMachine as published online on Jun. 4, 2010 at http://www.howtogeek.com/howto/18285/sync-specific-folders-with-dropbox, 7 pages.
"How-to Geek, How to Sync Specific Folders With Dropbox," originally written on Jun. 1, 2010 and archived version retrieved from WaybackMachine as published online on Jul. 4, 2014 at http://www.howtogeek.com/howto/18285/sync-specific-folders-with-dropbox, 5 pages.
Exam Report for GB1413461.3; Applicant: Box, Inc., Mailed Aug. 21, 2015, 6 pages.
Fu et al., "Efficient and Fine-Grained Sharing of Encrypted Files," Quality of Service (IWQos), 2010 18th International Workshop on year 2010, pp. 1-2.
Exam Report for GB1316532.9; Applicant: Box, Inc., Mailed Mar. 8, 2016, 3 pages.
U.S. Appl. No. 61/702,662, filed Sep. 18, 2012 Sandboxing Individual Applications to Specific User Folders in a Cloud-Based Service.
U.S. Appl. No. 13/830,016, filed Mar. 14, 2013 Sandboxing Individual Applications to Specific User Folders in a Cloud-Based Service.
U.S. Appl. No. 61/620,568, filed Apr. 5, 2012 Synchronization Client Selective Subfolder Syncing in a Cloud-Based Environment.
U.S. Appl. No. 13/856,607, filed Apr. 4, 2013 Method and Apparatus for Selective Subfolder Synchronization in a Cloud-Based Environment.
U.S. Appl. No. 13/954,680, filed Jul. 30, 2013 System and Method for Advanced Control Tools for Administrators in a Cloud-Based Service.
U.S. Appl. No. 62/005,659, filed May 20, 2014 Enterprise Admin Selectively Imposed Sync Permissions at a Client End or Client Device.
U.S. Appl. No. 62/006,799, filed Jun. 24, 2014 Enterprise Administrator Selectively Imposed Sync Permissions at a Client End or a Client Device.
U.S. Appl. No. 62/044,920, filed May 20, 2014 Synchronization Permissions Selectively Imposed by an Enterprise Admin on Files and/or Folders at a Client Device.
U.S. Appl. No. 14/726,196, filed May 29, 2015 Synchronization of Permissioned Content in Cloud-Based Enviroments.
U.S. Appl. No. 61/505,999, filed Jul. 11, 2011 Desktop Application for Access and Interaction with Workspaces in a Cloud-Based Content Management System and Synchronization Mechanisms Thereof.
U.S. Appl. No. 13/282,427, filed Oct. 26, 2011 Desktop Application for Access and Interaction with Workspaces in a Cloud-Based Content Management System and Synchronization Mechanisms Thereof.
U.S. Appl. No. 61/564,425, filed Nov. 29, 2011 Mobile Platform Folder Synchronization and Offline Synchronization.
U.S. Appl. No. 61/568,430, filed Dec. 8, 2011 Mobile Platform File and Folder Selection Functionalities for Offline Access and Synchronization.
U.S. Appl. No. 61/560,685, filed Nov. 16, 2011 Temporal and Spatial Processing and Tracking of Events in a Web-Based Collaboration Environment for Asychronous Delivery in an Ordered Fashion.
U.S. Appl. No. 13/524,501, filed Jun. 15, 2012 Resource Effective Incremental Updating of a Remote Client With Events Which Occurred Via a Cloud-Enabled Platform.
U.S. Appl. No. 13/526,437, filed Jun. 18, 2012 Managing Updates at Clients Used by a User to Access a Cloud-Based Collaboration Service.
U.S. Appl. No. 14/658,423, filed Mar. 16, 2015 Managing Updates at Clients Used by a User to Access a Cloud-Based Collaboration Service.

(56) References Cited

OTHER PUBLICATIONS

U.S. Appl. No. 61/620,554, filed Apr. 5, 2012 Device Pinning Capability for Enterprise Cloud Service and Storage Accounts.
U.S. Appl. No. 13/493,922, filed Jun. 11, 2012 Device Pinning Capability for Enterprise Cloud Service and Storage Accounts.
U.S. Appl. No. 61/702,622, filed Sep. 18, 2012 Sandboxing Individual Applications to Specific User Folders in a Cloud-Based Service.
U.S. Appl. No. 13/830,016, filed Mar. 4, 2013 Sandboxing Individual Applications to Specific User Folders in a Cloud-Based Service.
U.S. Appl. No. 61/622,868, filed Apr. 11, 2012 Web and Desktop Client Synchronization of Mac Packages With a Cloud-Based Platform.
U.S. Appl. No. 13/618,993, filed Sep. 14, 2012 Cloud Service Enabled to Handle a Set of Files Depicted to a User as a Single File in a Native Operating System.
U.S. Appl. No. 61/643,116, filed May 4, 2012 Hbase Redundancy Implementation for Action Log Framework.
U.S. Appl. No. 13/890,172, filed May 8, 2013 Repository Redundancy Implementation of a System Which Incrementally Updates Clients With Events That Occurred Via a Cloud-Enabled Platform.
U.S. Appl. No. 13/888,308, filed May 6, 2013 Repository Redundancy Implementation of a System Which Incrementally Updates Clients With Events That Occurred Via a Cloud-Enabled Platform.
U.S. Appl. No. 61/693,521, filed Aug. 27, 2012 Backend Implementation of Synchronization Client Selective Subfolder Syncing in a Cloud-Based Environment.
U.S. Appl. No. 14/010,851, filed Aug. 27, 2013 Server Side Techniques for Reducing Database Workload in Implementing Selective Subfolder Synchronization in a Cloud-Based Environment.
U.S. Appl. No. 61/751,578, filed Jan. 11, 2013, Functionalities Features, and User Interface of a Synchronization Client to a Cloud-Based Environment.
U.S. Appl. No. 14/153,726, filed Jan. 13, 2014 Functionalities, Features, and User Interface of a Synchronization Client to a Cloud-Based Environment.
U.S. Appl. No. 61/750,474, filed Jan. 9, 2013 File System Event Monitor and Event Filter Pipeline for a Cloud-Based Platform.
U.S. Appl. No. 14/149,586, filed Jan. 7, 2014 File System Monitoring in a System Which Incrementally Updates Clients With Events That Occurred in a Cloud-Based Collaboration Platform.
U.S. Appl. No. 61/753,761 Conflict Resolution, Retry Condition Management, and Handling of Problem Files for the Synchronization Client to a Cloud-Based Platform.
U.S. Appl. No. 14/158,626 Conflict Resolution, Retry Condition Management, and Handling of Problem Files for the Synchronization Client to a Cloud-Based Platform.
U.S. Appl. No. 61/739,296, filed Dec. 19, 2012 Synchronization of Read-Only Files/Folders by a Synchronization Client With a Cloud-Based Platform.
U.S. Appl. No. 14/135,311, filed Dec. 19, 2013 Method and Apparatus for Synchronization of Items With Read-Only Permissions in a Cloud-Based Environment.
U.S. Appl. No. 61/748,399, filed Jan. 2, 2013 Handling Action Log Framework Race Conditions for a Synchronization Client to a Cloud-Based Environment.
U.S. Appl. No. 14/146,658, filed Jan. 2, 2014 Race Condition Handling in a System Which Incrementally Updates Clients With Events That Occurred in a Cloud-Based Collaboration Platform.
U.S. Appl. No. 61/822,170, filed May 10, 2013 Identification and Handling of Items to Be Ignored for Synchronization With a Cloud-Based Platform by a Synchronization Client.
U.S. Appl. No. 14/275,890, filed May 13, 2014 Identification and Handling of Items to Be Ignored for Synchronization With a Cloud-Based Platform by a Synchronization Client.
U.S. Appl. No. 61/822,191, filed May 10, 2013 Systems and Methods for Depicting Item Synchronization With a Cloud-Based Platform by a Synchronization Client.
U.S. Appl. No. 14/275,401, filed May 12, 2014 Top Down Delete or Unsynchronization on Delete of Item Synchronization with a Synchronization Client to a Cloud-Based Platform.
U.S. Appl. No. 61/834,756, filed Jun. 13, 2013 Systems and Methods for Event Building, Collapsing, or Monitoring by a Synchronization Client of a Cloud-Based Platform.
U.S. Appl. No. 14/304,038, filed Jun. 13, 2014 Systems and Methods for Synchronization Event Building and/or Collapsing by a Synchronization Component of a Cloud-Cased Platform.
U.S. Appl. No. 61/838,176, filed Jun. 21, 2013 Maintaining and Updating File System Shadows on a Local Device by a Synchronization Client of a Cloud-Based Platform.
U.S. Appl. No. 14/312,482, filed Jun. 23, 2014 Maintaining and Updating File System Shadows on a Local Device by a Synchronization Client of a Cloud-Based Platform.
U.S. Appl. No. 61/860,050, filed Jul. 30, 2013 Scalability Improvement in a System Which Incrementally Updates Clients With Events That Occurred in a Cloud-Based Collaboration Platform.
U.S. Appl. No. 14/194,091, filed Feb. 28, 2014 Scalability Improvements in a System Which Incrementally Updates Clients With Events That Occurred in a Cloud-Based Collaboration Platform.
Exam Report for GB1316532.9, Applicant: Box, Inc., Mailed Mar. 27, 2015, 6 pages.
Burney, "How to Move Document from Your Computer to Your iPad and Back Again," May 31, 2011, 3 pages.
Kretzschmar et al., "Functional Components for a Security Manager within Future Inter-Cloud environments," Copyright 2011 IEEE, 5 pages.
Li et al., "CloudVO: Building a Secure Virtual Organization for Multiple Clouds Collaboration," Copyright 2010 IEEE, 6 pages.
Mont et al., "Risk Assessment and Decision Support for Security Policies and Related Enterprise Operational Processes," Copyright 2011 IEEE, 4 pages.
TaheriMonfared et al., "Monitoring Intrusions and Security Breaches in Highly Distributed Cloud Environments," Copyright 2011 IEEE, 6 pages.
Vimercati et al., "Managing and Accessing Data in the Cloud: Privacy Risks and Approaches," Copyright 2012 CRiSIS, 9 pages.
Wang et al., "Data Leakage Mitigation for Discretionary Access Control in Collaboration Clouds," Copyright 2011 ACM, 10 pages.

* cited by examiner

MOBILE PLATFORM FILE AND FOLDER SELECTION FUNCTIONALITIES FOR OFFLINE ACCESS AND SYNCHRONIZATION

CROSS-REFERENCE TO RELATED APPLICATIONS

The present application claims priority to and benefit from: (1) U.S. Provisional Patent Application Ser. No. 61/564,425 titled "Mobile Platform Folder Synchronization And Offline Synchronization", filed on Nov. 29, 2011; and (2) U.S. Provisional Patent Application Ser. No. 61/568,430 titled "Mobile Platform File and Folder Selection Functionalities For Offline Access and Synchronization", filed on Dec. 8, 2011. The entire content of the aforementioned applications are expressly incorporated by reference herein.

BACKGROUND

Static content such as audio/video files or email messages can be synced between a cloud server and a portable media player, or between a portable media player and a computer, for example. The syncing occurs when a new content arrives at the server, or when a user makes a request. Syncing can result in new content, updated content and/or deleted content.

DETAILED DESCRIPTION

Figure 1:
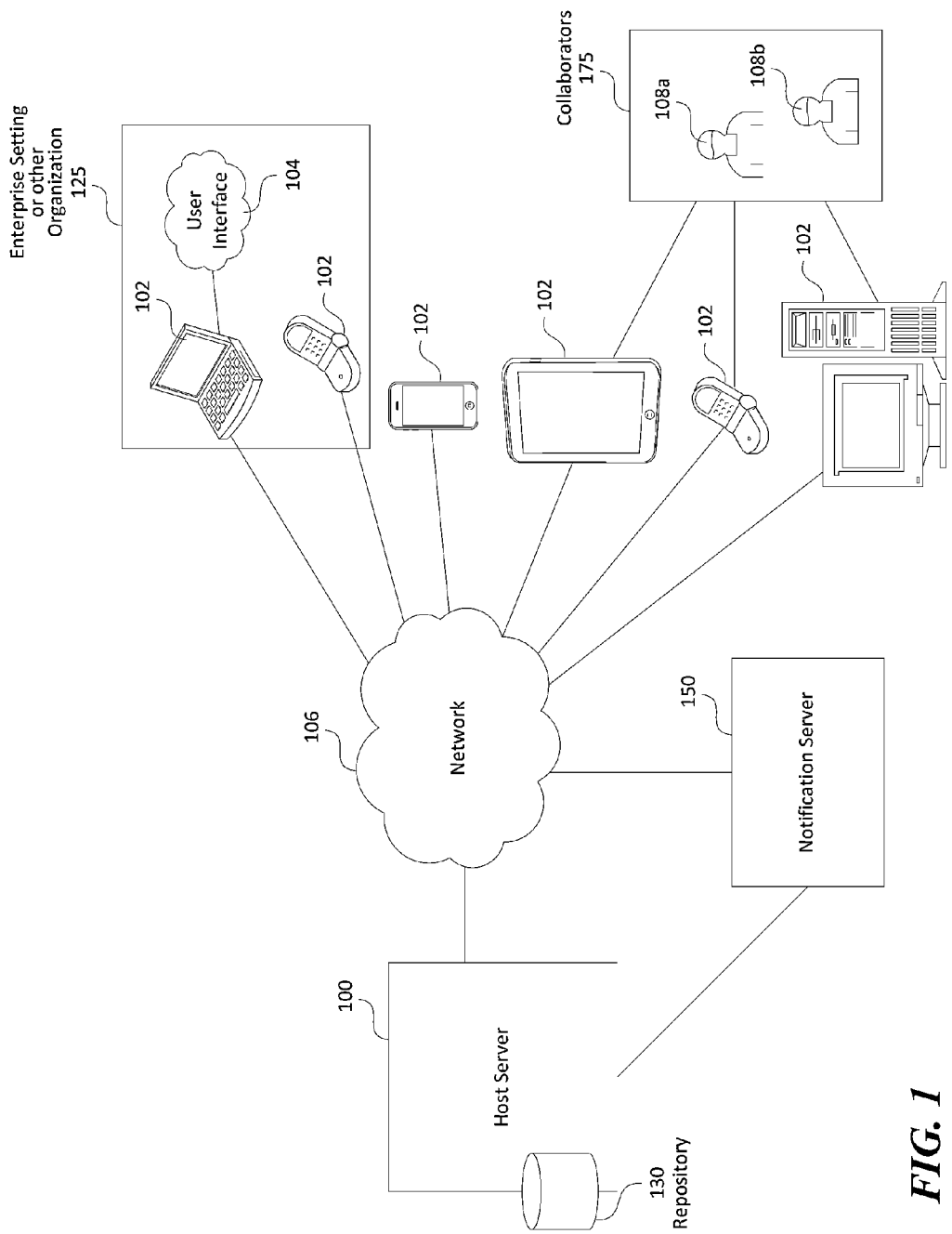
FIG. 1 illustrates an example diagram of a system having a host server able to facilitate folder synchronization and offline synchronization with its mobile platform.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for folder synchronization and/or offline synchronization via a mobile platform of a web-based collaboration environment.

FIG. 1 illustrates an example diagram of a system having a host server 100 able to facilitate folder synchronization and offline synchronization with its mobile platform.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and app server 110 are coupled via a network 106 and/or a network 108. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
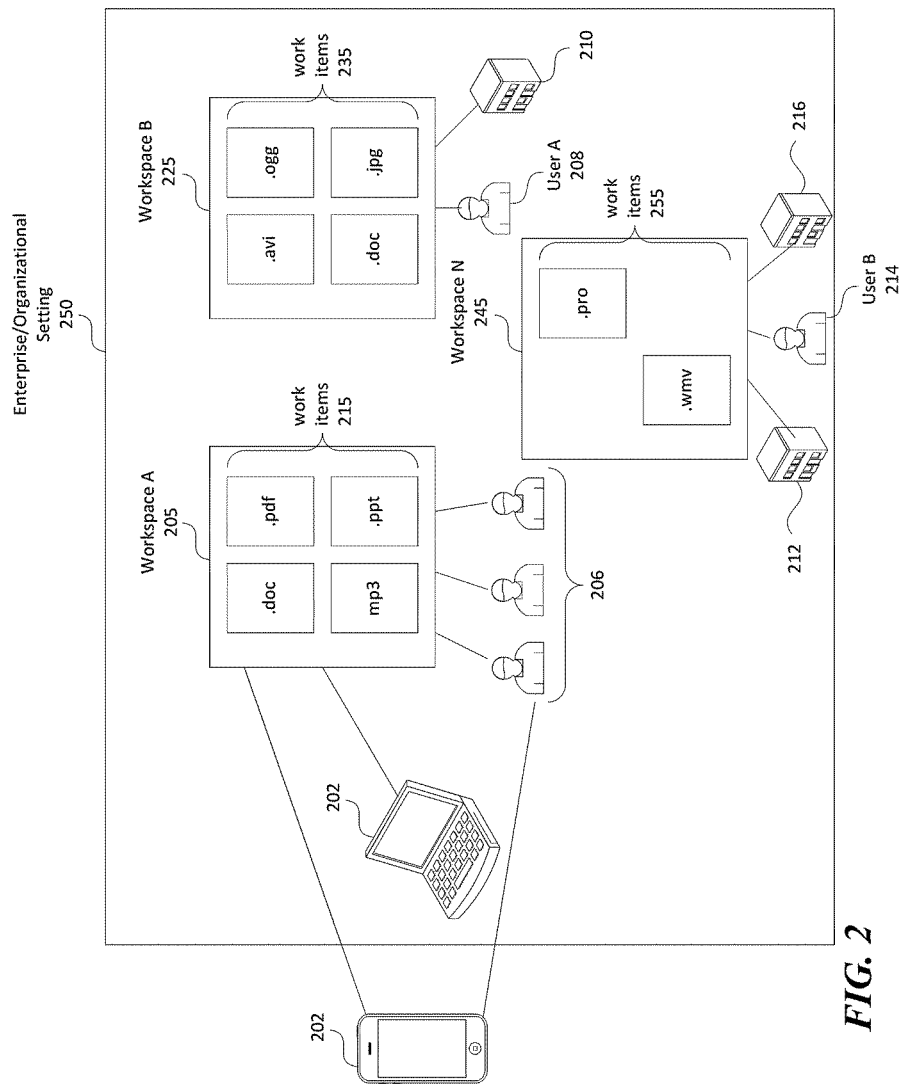
FIG. 2 depicts an example diagram of a web-based or online collaboration platform deployed in an enterprise or other organizational setting for organizing work items and workspaces, accessible using a mobile site or using a mobile platform.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, the host server 100 of the online or web-based collaboration environment provides platform and application independent methods and features for networked file access and editing by a remote device (e.g., by user devices 102). Specifically, the host server 100 and components residing on a client side (e.g., on a user device 102) enables a user to edit files or other work items on the host server 100 using their own choice of applications, or any application that is available on the device 102 they are using to access/edit the file, and regardless of the device 102 platform (e.g., mobile, or desktop or operating system).

Furthermore, the user can edit the file accessed from the host server 100 without the additional process of manually downloading and storing the file locally on the device 102. For example, the file may be ready for the user to edit locally without informing that the file is stored or prompting the user for a directory in which to store the file, to streamline the access/edit process to enhance user experience.

Functions and techniques disclosed for platform and/or application independent file access/editing are further described with reference to the components illustrated in the example of FIGS. 5-6. Functions and techniques performed by the host server 100, the client side components on a device 102, and other related components therein are described, respectively, in detail with further reference to the examples of FIGS. 5-8.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or online collaboration platform deployed in an enterprise or other organizational setting 250 for organizing work items 215, 235, 255 and workspaces 205, 225, 245, accessible using a mobile site or using a mobile platform.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in a organizational setting, multiple workspaces (e.g., workspace A, B C) can be created to support different projects or a variety of work flows. Each workspace can have its own associate work items. For example, work space A 205 may be associated with work items 215, work space B 225 can be associated with work items 235, and work space N can be associated with work items 255. The work items 215, 235, and 255 may be unique to each work space but need not be. For example, a particular word document can be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set one permission setting applicable to all work items 235 for other associated users and/or users associated with the affiliate department 210, for example. Creator user A 208 may also set different permission settings for each work item, which may be the same for different users, or varying for different users.

In each work space A, B . . . N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, an upload of an edited or modified file.

Figure 3:
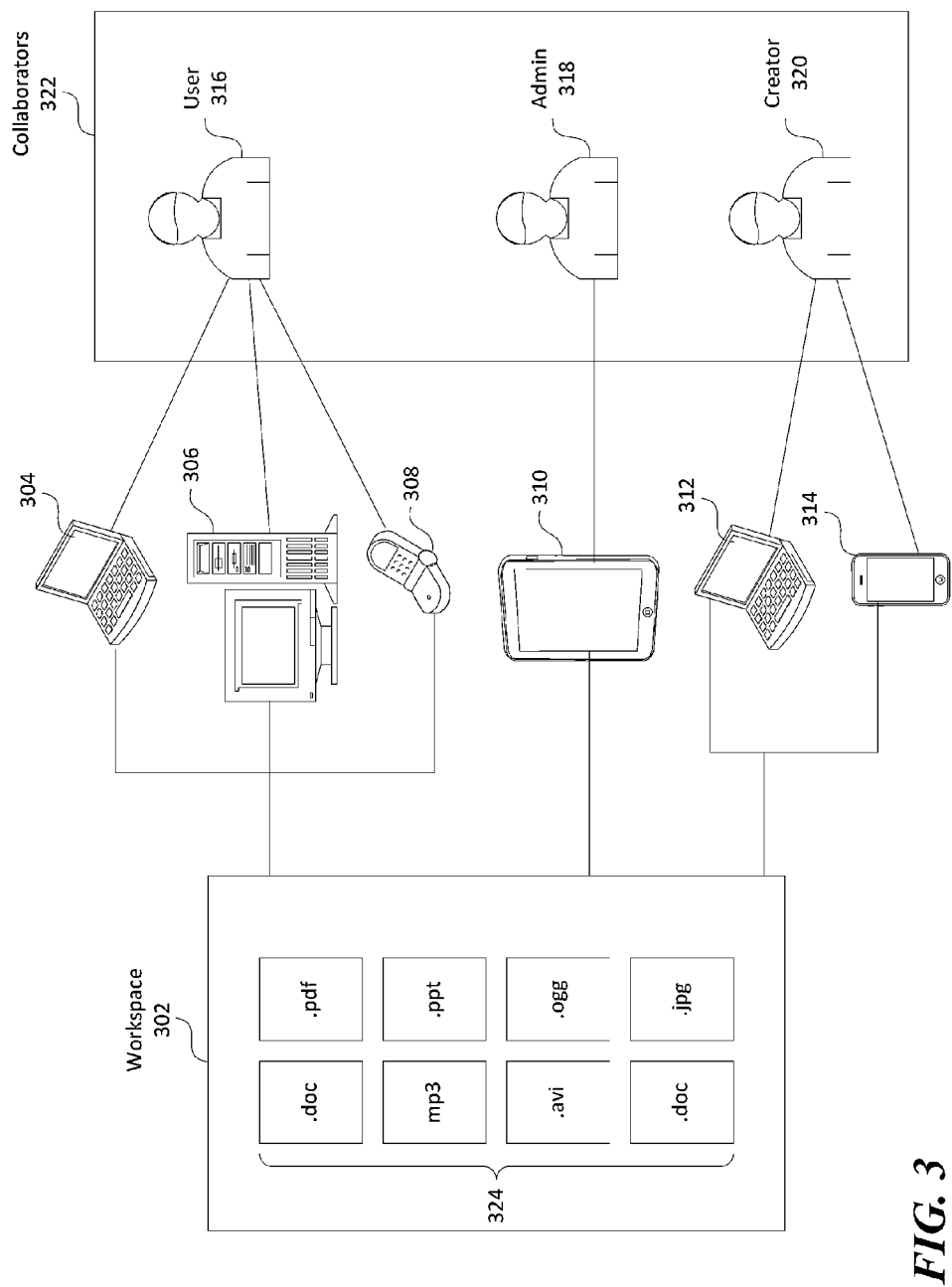
FIG. 3 depicts an example diagram of a workspace in an online or web-based collaboration environment accessible by multiple collaborators through various devices, including via a mobile site or mobile platform associated with the collaboration environment.

FIG. 3 depicts an example diagram of a workspace 302 in an online or web-based collaboration environment accessible by multiple collaborators 322 through various devices, including via a mobile site or mobile platform associated with the collaboration environment.

Each of users 316, 318, and 320 can individually use multiple different devices to access and/or manipulate work items 324 in the work space 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302 in accordance with the platform and/or application independent mechanisms disclosed herein, as further described with references to the examples of FIGS. 4-13. Users can also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

Figure 4:
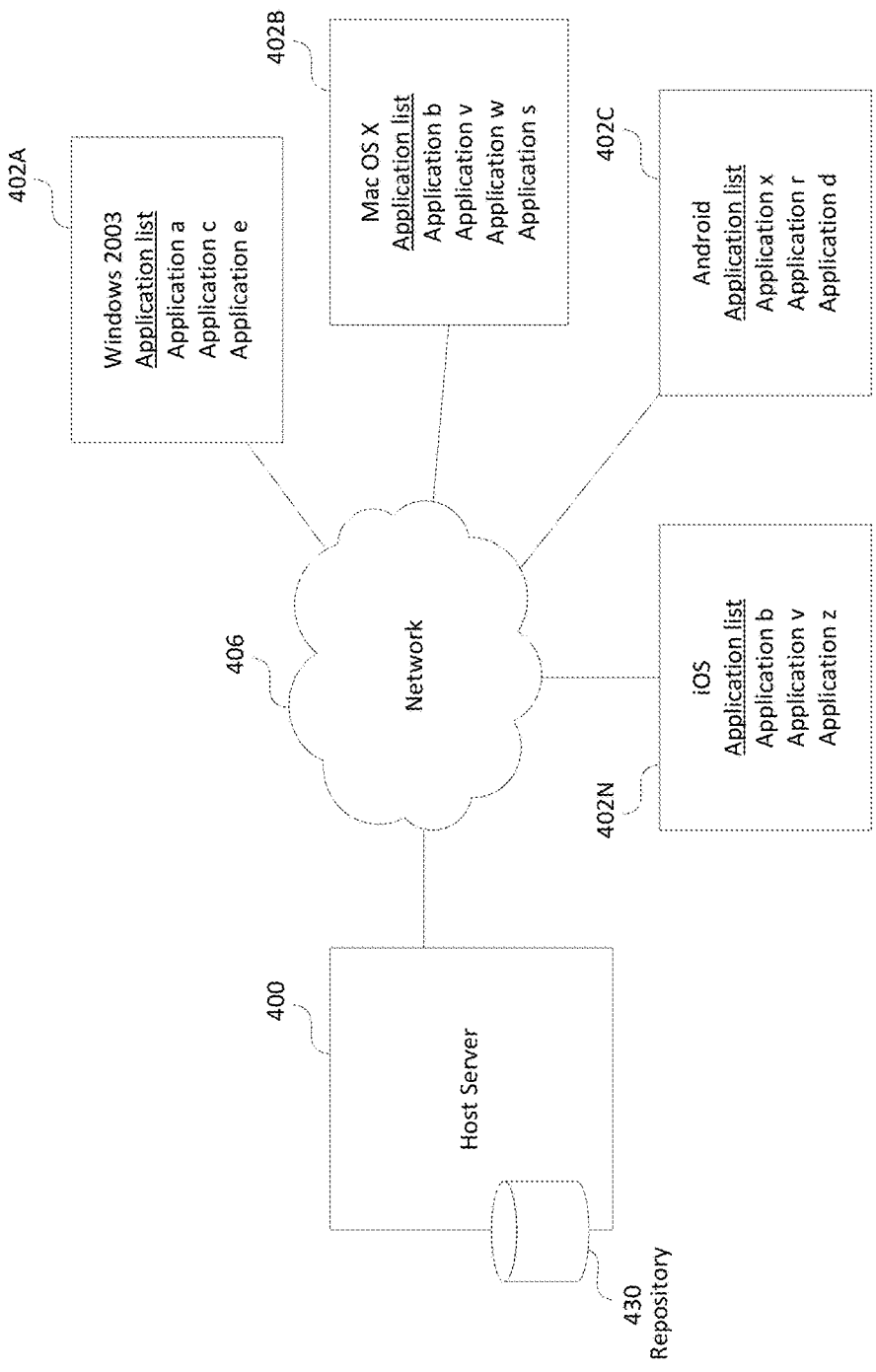
FIG. 4 depicts a block diagram illustrating an example system in which work items or files hosted by the host server of a collaboration environment can be edited or accessed remotely by devices independent of the platform or locally available applications, including via a mobile site or mobile platform associated with the collaboration environment.

FIG. 4 depicts a block diagram illustrating an example system in which work items or files hosted by the host server 400 of a collaboration environment can be edited or accessed remotely by devices 402 (402A-N) independent of the platform or locally available applications, including via a mobile site or mobile platform associated with the collaboration environment.

For example, any given file initially stored on the host server 400 (e.g., in the repository 430) can be edited using any of the devices 402A-N, despite the differing platforms and operating systems. Furthermore, any given file stored on the host 400 can be edited or accessed using any device 402A-N, as long as each individual device has an application which can open/edit the file type of the requested file.

In general, the process of identifying a local application suitable for accessing a file requested from the host server 400 is streamlined and automatic, and can be performed without prompting the user. Since the local components on a local device is able to query or monitor the operating system of any of the devices 402A-N to identify one or more suitable applications (e.g., default application or preferred application) for the file type of the requested file. By communicating with the operating system, (e.g., by monitoring the OS through the API, registry, or other methods), the process for detecting a suitable application for each device is operating system (platform)-independent and application-independent, thus working with any of the devices 402A-N and any other types of devices running different operating systems, platforms, and/or having installed thereon different applications.

Figure 5:
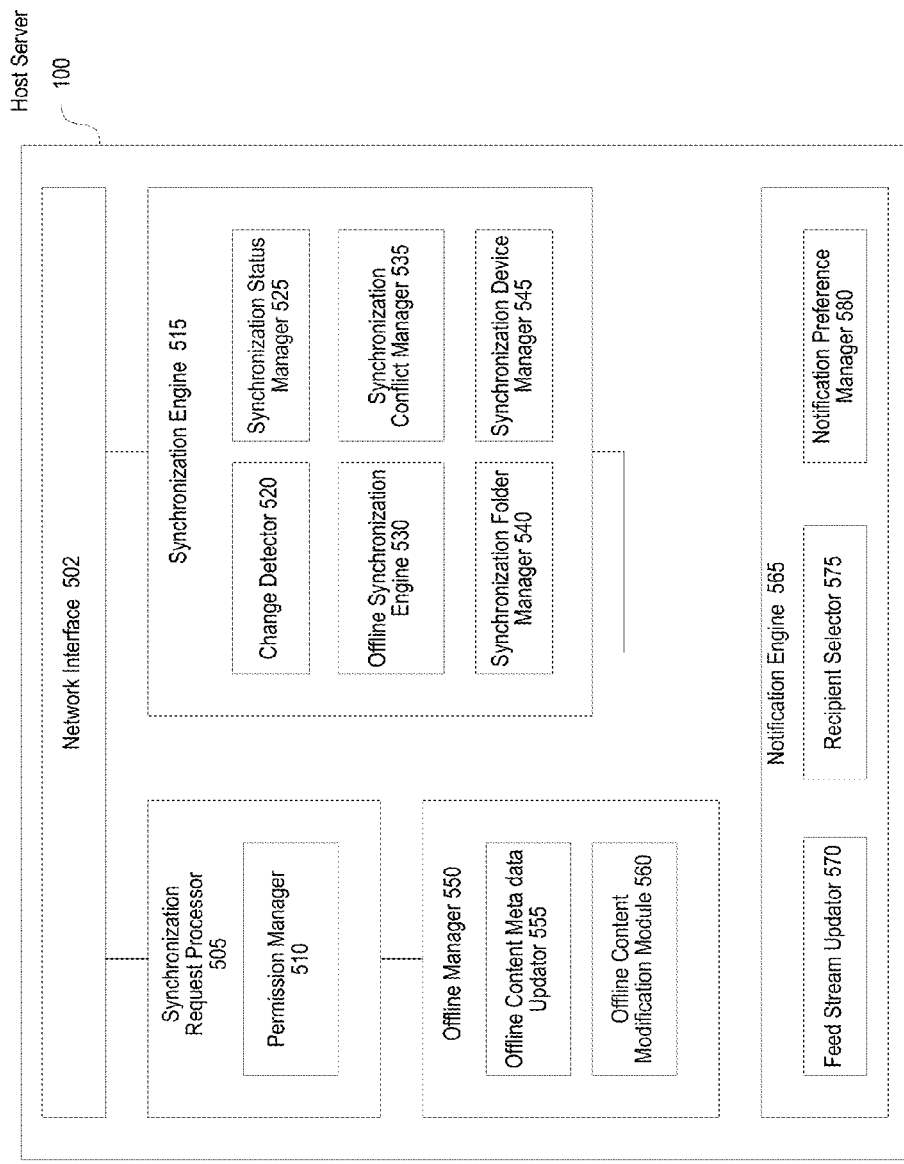
FIG. 5 depicts a block diagram illustrating an example of components in a host server 100 for facilitating folder synchronization and/or offline synchronization on a mobile device via a mobile platform.

FIG. 5 depicts a block diagram illustrating an example of components in a host server 100 for facilitating folder synchronization and/or offline synchronization on a mobile device via a mobile platform.

The host server 100 of the web-based or online collaboration environment can generally be a cloud-based service. The host server 100 can include, for example, a network interface 502, a synchronization request processor 505 having a permission manager 510 and a synchronization engine 515 having a change detector 520, a synchronization status manager 525, an offline synchronization engine 530, a synchronization conflict manager 535, a synchronization folder manager 540 and a synchronization device manager 545, for example. The host server 100 may also include an offline manager 550 having an offline content meta data updator 555 and an offline content modification module 560. One embodiment of the host server 100 further optionally includes a notification engine 565 having, for example, a feed stream updator 570, a recipient selector 575 and/or a notification preference module 580. Additional or less components/modules/engines can be included in the host server 100 and each illustrated component.

The network interface 502 can be a networking module that enables the host server 100 to mediate data in a network with an entity that is external to the host server 400, through any known and/or convenient communications protocol supported by the host and the external entity. The network interface 502 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," a "handler," a "detector," an "interface," a "processor," a "tracker," a "detector," a "generator," a "launcher," a "selector," an "updator," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The host server 100 can track a user's folders and its subfolders in a given work space and across work spaces. Through the web or mobile application, the user can specify which folders or subfolders to synchronize for access using a mobile device (e.g., via a mobile platform), for example, when the mobile device or the mobile application enabled by the mobile platform is offline. The host server 100 of the collaboration platform can track the user's selections (e.g., the user can select 'favorite' folders or sub-folders, or otherwise indicate one or more sub-folders and the content that are to be made available offline) and stores the preferences (e.g., managed by the offline synchronization engine 530 and/or the synchronization folder manager 540). The host server 100 can track folder-level and/or sub-folder level synchronization preferences across multiple users and multiple workspace, and/or across multiple work spaces for a given user.

When a request to synchronize with a mobile device is received (e.g., via the mobile platform deployed on the mobile device 600), the synchronization request processor 505 checks with the permission manager 510 to see whether the requesting device has the proper permission to access or synchronize a given folder/sub-folder, or to access a given work space having the content or folders to be synchronized.

The request can be generated automatically by the mobile platform, at periodic intervals, or automatically whenever the mobile application is online. The request to synchronize can also be triggered by user request from the mobile device 600. The permission information may be embedded in the folder/sub-folder meta data in one embodiment. The permission manager 510 can examine the meta data of the selected folder/sub-folder and determine from the meta data whether the user of the mobile device has adequate privileges to access or synchronize the selected folder/sub-folder.

In one embodiment, the permission manager may allow an admin or a creator of a workspace, that includes folders or sub-folders that are collaborated on by a number of users, to specify the type of synchronization that is allowed. For example, some users can have bi-directional synchronization privileges that allow the users to download updated folders or sub-folders from the host server to their client devices, and upload updated folders or sub-folders from their client devices to the host server. Since bi-directional synchronization of collaborated folders or sub-folders can create conflicts, limiting the bi-directional synchronization privileges to select users can be advantageous. Alternately, the synchronization may be unidirectional, from the server to the client devices. In one implementation, a collaborated folder or sub-folder that is updated on the client device can be sent to the admin of the workspace for synchronization approval The offline manager 550 keeps track of the folders, sub-folders and the content therein that have been selected or provided for offline access via the offline content meta data updator 555 and the offline content modification module 560. The offline content meta data updator 555, for example, updates the meta data of the selected folder/sub-folder and/or the content therein to include an offline status, indicator or tag. The offline status, indicator or tag may be provided by the synchronization status manager 525 of the synchronization engine 515 in one embodiment. In one implementation, the offline content meta data updator 555 may also add to the folder/sub-folder meta data a time stamp indicating the date and time the folder/sub-folder was synchronized and provided for offline access.

The offline content modification module 560 includes one or more rules to determine whether a folder/sub-folder and content therein can be accessed or modified by other users or collaborators of the cloud-based collaboration platform. For example, in one implementation, the offline content modification module 560 may be configured to restrict other users of the collaboration platform from accessing or modifying the folder/sub-folder selected for offline access. In another implementation, one or more rules may be implemented by the offline content modification module 560 to manage folders/sub-folders that are provided for offline access. For example, a rule that allows a selected user or a group of users to modify the server copy of the folder/sub-folder provided for offline access may be implemented by the offline content modification module 560. Similarly, another rule that allows some users or collaborators only read/download access may be implemented by the offline content modification module 560. The implementation of one or more of the rules for allowing or restricting access, modification, and/or other actions on the folder/sub-folder selected for offline access can be customized by the user according to the user's preference. In one implementation, the user's preference for managing at the server folder/sub-folder selected for offline access may be stored in a preference setting database. The offline content modification module 560 may access the preference setting database to retrieve applicable rules configured by the user to manage the given folder/sub-folder at the server side.

The synchronization engine 530 performs the synchronization of the selected workspace or selected folder/sub-folder and all of the sub-folders within the selected folder. In one embodiment, the content in the selected folder and/or sub-folder are synchronized by detected changed content, for example, via the change detector 520. For example, in synchronization, the selected folder and its child/subfolders can be scanned by the synchronization engine 530 to detect changed content since the last synchronization. In one implementation, the change detector 520 examines the time stamp on the selected folder/sub-folder and/or content therein to determine if the folder/sub-folder has changed since it was last synchronized. The changed content can then be provided to the mobile device 600. The change detector 520 can also identify any new sub-folders within the selected folder and/or new content within the selected folder/sub-folder on the host server 100 based on the date and time of the last synchronization operation. If there is new content on the host server in a folder selected to be synchronized, or in a sub-folder, the new content may be synchronized with the user device/mobile device in its entirety. In one embodiment, synchronization of the selected folders/sub-folders may occur automatically whenever the user device/mobile device 600 goes online to enable offline access of the content in the selected folder. Alternately, the synchronization may occur upon user request, and/or when a new content is available for synchronization.

In one embodiment, the synchronization engine 515 includes a synchronization status manager 525 to keep track of the synchronization status of workspaces, folders, sub-folders and content therein. The synchronization status manager functions may be particularly important if the user has configured synchronization to occur on demand and not automatically whenever there is a new or updated content or when the mobile device 600 is online. When a request to provide selected folder/sub-folder for offline access is received by the host server 100, the synchronization engine 530 checks with the synchronization status manager 525 to determine whether the selected folder/sub-folder should be synchronized before marking the selected folder/sub-folder as being available for offline access. The synchronization status manager 525 compares the time stamp on a local copy of a folder/sub-folder in a mobile device and the time stamp on the copy of the folder/sub-folder in the host server. If the time stamp on the local copy and the host server copy are the same, the folder/sub-folder can be assigned a synchronization status such as "current" or "synced." The selected folder/sub-folder can then be marked as being available for offline access, without having to perform a synchronization. If the synchronization status is "out of date," i.e., either the host server or the mobile device has an updated copy of the folder/sub-folder, the offline synchronization engine 530 performs a synchronization operation such that both the host server and the mobile device can both have the most current folder/sub-folder.

When a mobile device 600 is online after being offline, offline folders/sub-folders may have been updated at the mobile device or the host server. In one implementation, an offline folder/sub-folder can be updated both at the host server and the mobile device by different users or collaborators, resulting in a conflict. The synchronization conflict manager 535 is responsible for determining, prior to performing a sync, whether the synchronization generates a conflict. The synchronization conflict manager 535 may, in one implementation, generate a notification regarding the conflict for the client device. In a further implementation, the synchronization conflict manager 535 may postpone synchronization of the folder/sub-folder in the event of conflict. In another implementation, the synchronization conflict manager 535 may assign the folder/sub-folder that generates a conflict when synchronized, a conflict status. The synchronization conflict manager 535 may further store the folder/sub-folder originating from the client device as a new version, and notify the client device of the conflict. In yet another implementation, the synchronization conflict manager 535 can evaluate the reason for conflict, and take an action accordingly. For example, if the reason for the conflict is addition of a comment, the synchronization conflict manager 535 can waive the conflict and synchronize the folder/sub-folder, while retaining the comment. By way of another example, the synchronization conflict manager 535 can also synchronize the folder/sub-folder with conflict status by merging the folders/sub-folders from the host server and the client device.

The synchronization folder manager 540 manages folder-level and/or sub-folder level synchronization preferences across multiple users and multiple workspaces, and/or across multiple work spaces for a given user. In one implementation, the synchronization preferences may be stored in a database accessible by the host server 100. Based on the synchronization preferences, the synchronization folder manager 540 can identify folders/sub-folders for synchronization. For example; in one implementation, a synchronization preference may indicate synchronization of folders/sub-folders one level up and one level below a selected folder/sub-folder. Based on the synchronization preference, the synchronization folder manager 540 examines the selected folder/sub-folder hierarchy and identifies folders/sub-folders for syncing by the offline synchronization engine 530. In another implementation, a synchronization preference may indicate syncing of all folders/sub-folders related to the selected folder/sub-folder. The synchronization folder manager 540 can then identify the related folders/sub-folders, screen the identified folders/sub-folders for changed content (e.g., via the change detector 520) and provide any of the identified folders/sub-folders having changed content to the offline synchronization engine 530 for synchronization with the client device. Various other synchronization preferences for identifying folders/sub-folders for syncing are contemplated.

In one embodiment, the synchronization engine 515 includes the synchronization device manager 545 for managing syncing of folders/sub-folders and/or content therein across multiple client devices running the web-based collaboration platform application. The synchronization device manager 545 manages device synchronization preferences set by the user. For example, the synchronization device manager 545 can register for synchronization one or more client devices specified by the user and coordinate syncing between the host server and the registered client devices. The synchronization device manager 545 may assist the synchronization request processor 505 having the permission manager 510 to accept requests for synchronization from any of the registered client devices. The synchronization device manager 545 may also assist the offline synchronization engine 530 to send synchronization packages (e.g., folders/sub-folders for syncing and/or offline access) to some or all of the registered client devices according to the synchronization preferences set up by the user.

One embodiment of the host server 100 includes the notification engine 565. The notification engine 565, can for example, update a feed stream to include an updated feed indicating that one or more folders/sub-folders have been uploaded, for example, via the feed stream updator 570. The users that are notified can be selected, for example, by the recipient selector 575, and can include collaborators or the user, or other users meeting a criterion. In some instances, the feed stream is updated in real time or near real time relative to when the upload of the folders/sub-folders is completed. For real-time updating, the notification engine 565 can utilize another server, or another engine in the same server which provides push functionality.

The notification engine 565 of the host server 100 can generally notify users, which can be collaborators of the user who performed the activity in the work space via one or more of many mechanisms, including but not limited to, email, SMS, voice-message, text-based message, RSS, feed, etc., as described in detail with further reference to related co-pending U.S. patent application Ser. No. 13/152,982 filed on Jun. 3, 2011. The contents of the aforementioned application are incorporated herein by reference in its entirety.

In one embodiment, the notification is depicted through a web-browser used by the other user to access the web-based collaboration environment, for access in real time or near real time to when the activity was performed by the user. When notifying a user in real time through a web-browser, the notification engine 565 can utilize a push-enabled service to ensure real time notification. In one embodiment, the notification is sent by a component or another server which implements push technology (e.g., the notification server 150 shown in the example of FIG. 1). The push-enabled service can be implemented via long poll or HTTP streaming, for example, by the notification severs 150 or another component, device which may be internal to or external to the host server 100. In addition, the host server 100 could utilize other push servers including third party push servers to implement push technology including but not limited to mobile platform push systems and services (e.g., via smart phones or tablets or other portable devices such as iPhone, Android phones, Blackberry, iPad, Galaxy or other tablets, and the like.)

The notification engine 565 includes a notification preference manager 580 that can determine the channel through which to notify selected users or recipients of an access request, a synchronization request, a synchronization completion, synchronization in progress, synchronization error, a download, a file edit/modification, a file save or upload (e.g., an upload request, completion of upload of a single item, multiple items, and/or a full upload request), and the like. The channels that are used can include, indicators via a user interface to the online collaboration environment, SMS, audio message, text-based messages, email, desktop application, RSS, and the like.

Figure 6:
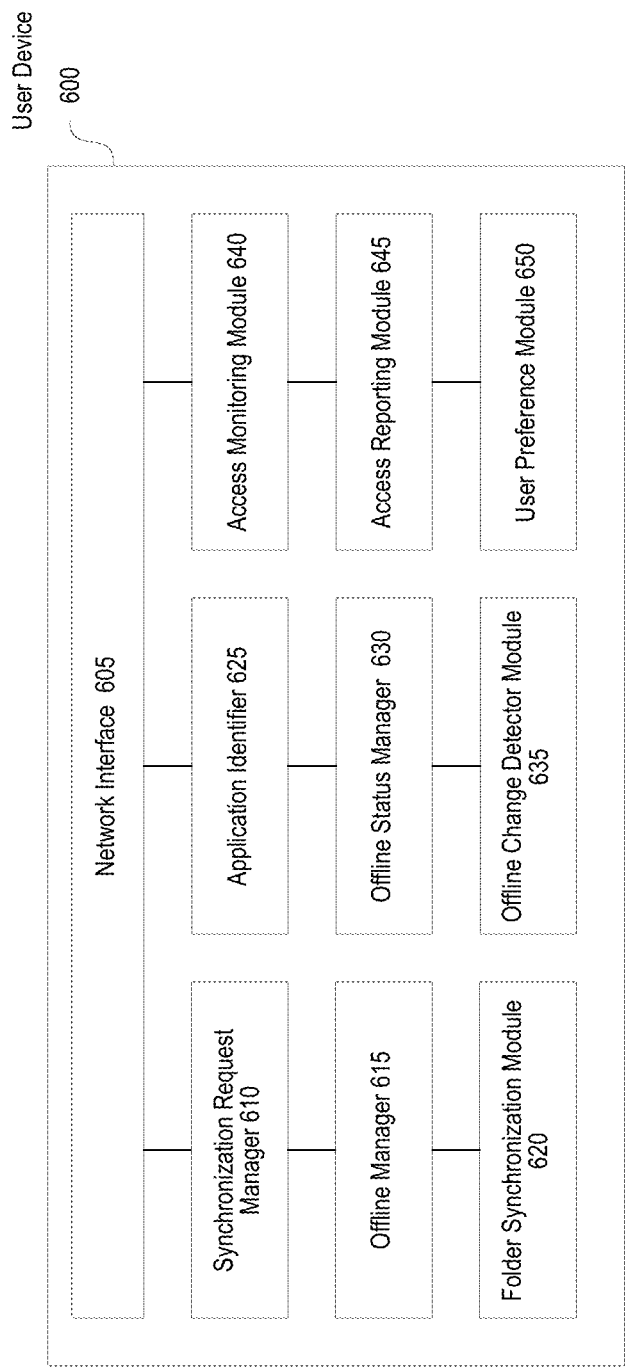
FIG. 6 depicts a block diagram illustrating an example of components on the user device 600 on which a mobile platform is deployed for folder/sub-folder synchronization and/or offline synchronization.

FIG. 6 depicts a block diagram illustrating an example of components on the client device or user device 600 on which a mobile platform is deployed for folder/sub-folder synchronization and/or offline synchronization.

The user device 600 (e.g., the user device 102, 402A-N) shown in the examples of FIG. 1 and FIG. 4 respectively) can include, for example, a network interface 605, a synchronization request manager 610, an offline manager 615, a folder synchronization module 620, an application identifier 625, an offline status manager 630, an offline change detector module 635, an access monitoring module 640, an access reporting module 645 and/or a user preference module 650. Additional or less components/modules/engines can be included in the user device 600 and each illustrated component. For example, the user device 600 usually includes a user interface component for providing user interfaces with which a user of the user device 600 can interact.

The network interface 605 can be a networking module that enables the user device 600 to mediate data in a network with an entity that is external to the host server 100, through any known and/or convenient communications protocol supported by the host and the external entity. The network interface 605 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," a "handler," a "detector," an "interface," a "processor," a "tracker," a "detector," a "generator," a "launcher," a "selector," an "updator," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The synchronization request manager 610 can generate, time, trigger automatic requests or process a user request to synchronize content accessible via the mobile platform on the user device 600 with content stored on the host server 100. In one embodiment, the synchronization request manager 610 sends periodic requests to synchronize some or all folders/sub-folders selected for syncing. These folders may be selected by the user of the user device 600, or other users of a given work space in which the folders reside. For example, an owner or admin of a given work space may specify or assign certain folders/subfolders to certain users to be accessible offline via the mobile platform. In one implementation, the syncing may be triggered when a user selects one or more folders/sub-folders or other content for offline access via the offline manager 615.

In one embodiment, the synchronization request manager 610 can also receive and process synchronization requests or notification from the host server 100. For example, the host server 100 determines whether any folders/sub-folders have changed or if any of the folders/sub-folders for synchronization include new or updated content. If so, the user device 600 (e.g., the synchronization request manager 610) is notified. The synchronization request manager 610 receiving the notification can display an indication of availability of an update and additionally, may prompt the user for confirmation prior to performing the synchronization via the folder synchronization module 620.

In one embodiment, the offline manager 615 can allow or facilitate selection of certain folders, sub-folders or other content for offline access. In one implementation, one or more of the selected folders, sub-folders or other content can be modified while the user device 600 is offline. A user of the user device 600 can make this selection by selecting the content or folders to be synced or otherwise available offline through the mobile platform/application on the mobile device 600, or via the web-based application accessed via a web-portal.

A synchronization event, when triggered at the user device 600, can include a request to synchronize a given folder, a given sub-folder, or all folders selected for synchronization or offline access. To synchronize a folder in this request, the folder synchronization module 620 automatically identifies all sub-folders of any folder included in the request. The identification of sub-folders and folders can then be sent to the host server 100 such that the request can be satisfied. In one implementation, along with the identification of sub-folders and folders, other folder/sub-folder meta data such as time stamp on the folder/sub-folder may also be sent to the host server 100. For example, when the selected folders/sub-folders are locally stored in the user device, the host server 100 can use the time stamp information to determine whether the locally stored folders/sub-folders the out of date or not.

In one embodiment, the application identifier 625 also facilitates identification of folders and sub-folders. In some instances or certain mobile operating systems, each application is associated with its own folders/sub-folders for content generated using the application or other supporting files. In the cases where one application does not have access to files/folders of other applications, the application identifier 625 can be used to identify the relevant or related folders/subfolders/child-folders for synchronization purposes. For example, by identifying the application used to open or modify content or a given file, the related folder/folders can be identified for synchronization.

The offline status manager 630 accords an offline status to the folders and sub-folders selected for offline access or modification. The offline status can be provided by, for example, modifying meta data associated with the selected folders/sub-folders. In one implementation, the offline status manager 630 can confer offline status to other folders, sub-folders or content items that are not directly selected by the user, but are identified by, for example, the folder synchronization module 620 for synchronization. In one implementation, the offline status of the folders and sub-folders may be used to select and display all folders/sub-folders available for offline access and/or modification in a separate folder or display area of a user interface provided by the user device 600.

The offline change detector module 635 detects change or modification to any of the folders, sub-folders or other content items selected for offline access or modification. The change that is detected includes, for example, changes to folder hierarchy, addition of sub-folders, or other content, change in the folder/sub-folder content, and the like. The change may be detected based on screening of the selected folders, sub-folders or other content items in one implementation. Alternately, the time stamp on the selected folders, sub-folders or other content items may be examined to detect change. The offline change detector module 635 can also detect change to the folders and sub-folders identified by the folder synchronization module 620. In one embodiment, some or all of the functions of the offline change detector module 635 can be performed by, for example, the change detector module 520 in the synchronization engine 515 in the host server 100.

The access monitoring module 640 monitors access history associated with folders and sub-folders selected for offline access. The access reporting module 645 can report the access history aggregated by the access monitoring module 640 to the host server 100. In one implementation, the access history may be reported as a part of the meta data associated with the selected folders and sub-folders that is provided to the host server 100, at the time of synchronization. Access history can include a record of actions such as access, preview, modify, email, print, comment, annotate, and the like, and in some implementations, date/time an action is performed, the length of time for each action, and the like.

The user preference module 650 includes user interfaces for obtaining from the user of the user device 600 preferences relating to various synchronization processes. The user preference module 650 further manages and communicates to the host server 100 the preferences for various synchronization processes. For example, the user preference module 650 allows the user to customize the synchronization request manager 610 to generate requests for syncing on demand, automatically upon receiving a trigger from the offline change detector module 635, periodically or whenever the user device 600 is online. The user preference module 650 may also allow the user to define criteria for identifying folders, sub-folders or other content items related to folders and sub-folders selected for offline access. The user preference module 650 may also allow the user to create and/or select one or more rules for allowing or restricting access, modification, and/or other actions on the selected folder/sub-folder at the host server. The user preference module 650 further allows the user to specify synchronization preferences for various components of the host server 100 such as, the synchronization folder manager 540, notification preference for the notification preference manager 580, synchronization device preferences for the synchronization device manager 545, and the like.

Although not discussed, the user device may also include other components. Furthermore, some or all of the processes described above with respect to the user device components can, in part or in whole, implemented on the host server (e.g., the host server 100). Some of the processes implemented by the host server may be in lieu of or in duplicate with those able to be performed by the components described herein with respect to the user device 600.

Figure 7:
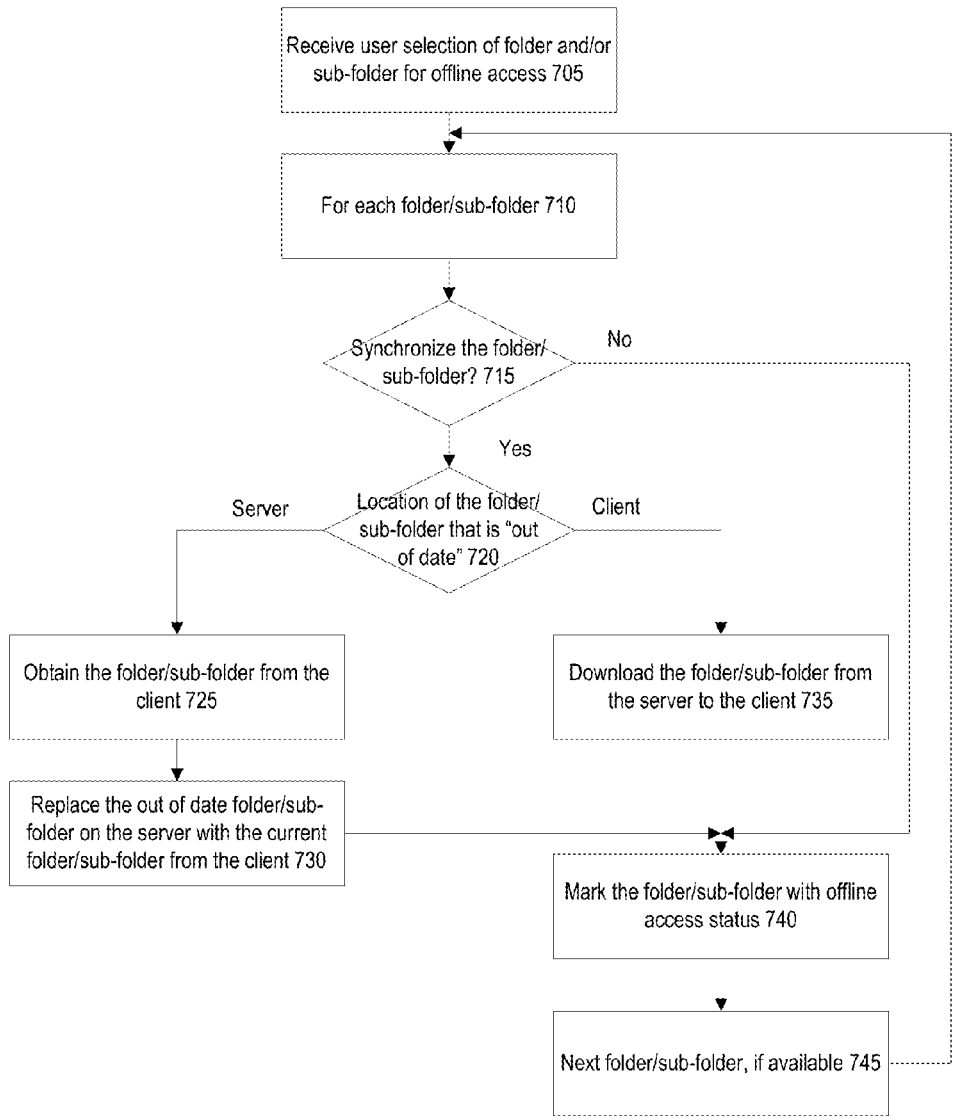
FIG. 7 is a logic flow diagram illustrating an example method for syncing user selected folders and/or sub-folders in a collaboration platform for offline access via the user device.

FIG. 7 is a logic flow diagram illustrating an example method for syncing user selected folders and/or sub-folders in a collaboration platform for offline access via the mobile device 600. In one implementation, at block 705, the host server 100 may receive from a user, a selection of one or more folders and/or sub-folders for offline access. The selection may be received and/or processed by the synchronization request manager 505, for example. The selection may be made by the user via, for example, the offline manager 615. At block 710, for each folder or sub-folder selected by the user, the host server determines if the folder or sub-folder requires syncing at decision block 715. The determination may be made based on information concerning the selected folder or sub-folder provided by the mobile device along with the user selection at block 705. The information concerning the selected folder or sub-folder may include, for example, an indication of whether the selected folder or sub-folder is available locally on the mobile device, and the time stamp on the selected folder or sub-folder. If the selected folder or sub-folder present in the mobile device is the same as the one on the host server, a synchronization is not necessary. The host server then confers an offline access status to the selected folder or sub-folder at block 740. The host server may also send an acknowledgement message to the mobile device so that the mobile device can also mark the selected folder or sub-folder as having an offline access status. At block 745, if more than one folder or sub-folder is selected, the process loops back to block 710 to evaluate the next folder or sub-folder selected by the user.

Alternately, the mobile device may have no local copy of the selected folder or sub-folder, or based on the time stamp comparison, the selected folder or sub-folder on the mobile device may not match the one on the host server. If so, at decision block 715, the host server determines that a synchronization should be performed. At decision block 720, the host server determines whether the selected folder or sub-folder on the mobile device or the host server is out of date based on the time stamp. For example, if the time stamp on the selected folder or sub-folder at the host server is more recent, then the mobile device is out of sync. At block 735, the host server sends the selected folder or sub-folder to the mobile device.

If, on the other hand, the time stamp on the selected folder or sub-folder at the mobile device is more recent, then the host server is out of sync. At block 725, the host server requests the mobile device to upload the selected folder or sub-folder to the host server. The upload may be performed automatically in the background in one implementation. In another implementation, the user of the mobile device may be requested to allow syncing with the host server. At block 730, the host server receives the selected folder or sub-folder from the mobile device and replaces the out of date folder or sub-folder on the server with the one obtained from the mobile device.

Figure 8:
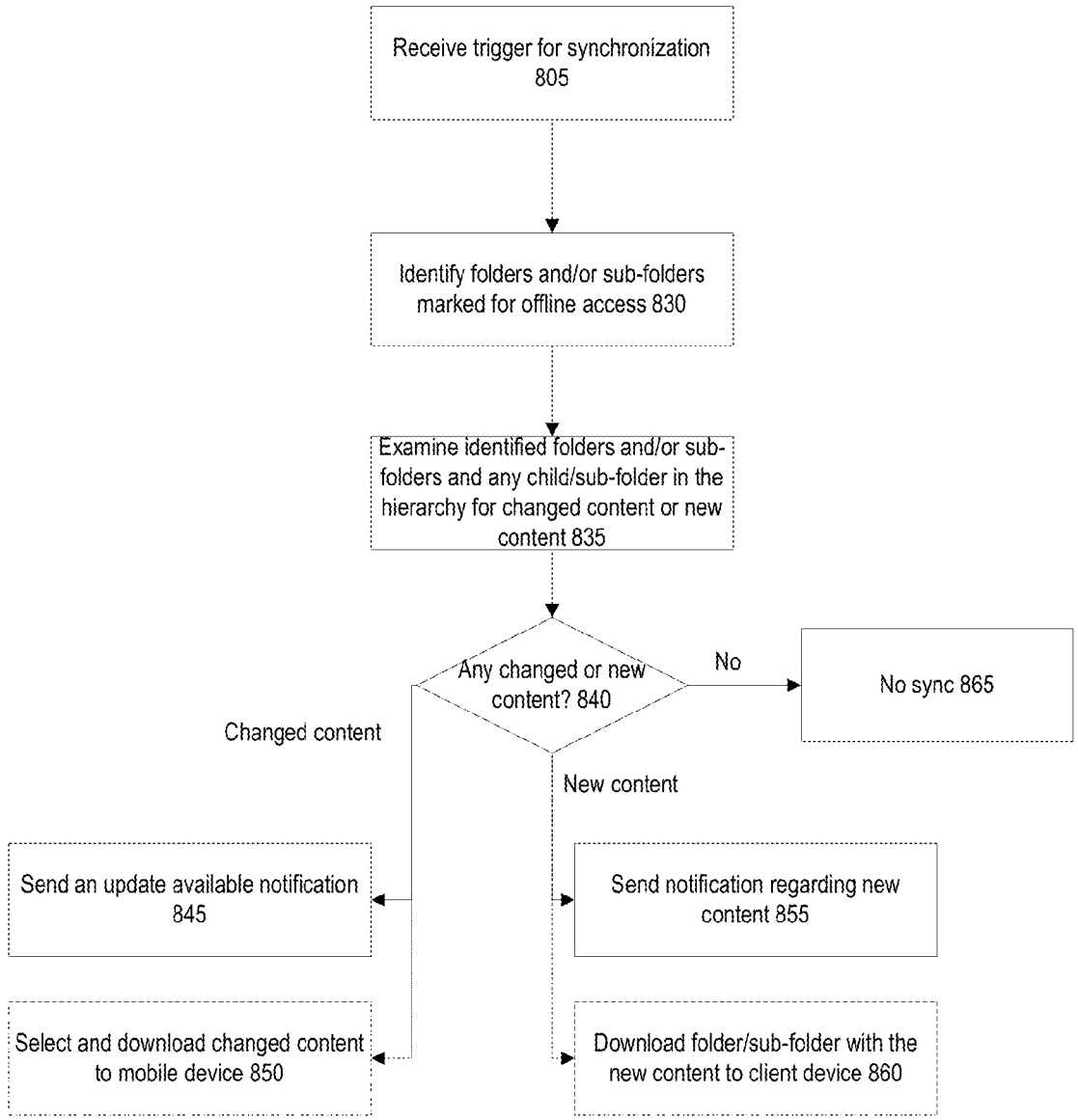
FIG. 8 is a logic flow diagram illustrating an example method for syncing folders and/or sub-folders selected for offline access in a collaboration platform via the mobile device.

FIG. 8 is a logic flow diagram illustrating an example method for syncing folders and/or sub-folders selected for offline access in a collaboration platform via the mobile device. At block 805, the host server receives a trigger for syncing the folders and/or sub-folders selected for offline access. The trigger may originate from the mobile device 600 or the host server 100. For example, in one implementation, the trigger may be generated by the mobile device going to an online state from an offline state. In another implementation, the trigger may be a user-generated synchronization request. In yet another implementation, the trigger may be a synchronization request periodically generated by the host server. In a further implementation, the trigger may be generated in response to detecting a change in the selected folders and/or sub-folders.

At block 830, the host server identifies folders and/or sub-folders marked for offline access or having an offline access status. At block 835, the host server examines the identified folders and/or sub-folders for changed content or new content. The host server also examines any child or sub-folders in the hierarchy of the identified folders and/or sub-folders for changed content or new content. In one implementation, the child or sub-folders in the hierarchy may be identified at the time of assigning offline access status to user selected folders and/or sub-folders, such that the child or sub-folders can also be marked as having offline status.

At decision block 840, the host server determines if there is any changed content or new content in the folders and/or sub-folders marked for offline access and any child or sub-folders thereof. In one implementation, any change in the folders, sub-folders and/or child folders are determined based on the current time stamp and last synchronization date and time. For example, a folder and/or a sub-folder includes changed content if the time stamp on the folder and/or the sub-folder is more recent than the last synchronization date. If there is a changed content, the host server can send an update available notification to the mobile device at block 845. In one implementation, the host server can send identification of the folders and/or sub-folders and content therein that have changed content. The host server then waits for a synchronization request from the user to download the changed folders and/or sub-folders. Alternately, the host server can select and download changed folders and/or sub-folders to the mobile device at block 850, and provide a synchronization completed notification to the mobile device. The block 850 option may be implemented based on user preference.

At decision block 840, if the host server determines that there is a new content in any of the folders and/or sub-folders having offline access status, the host server sends a new content available notification to the mobile device at block 855. In one implementation, the notification can include identification of folders and/or sub-folders having the new content. The host server downloads the folder and/or sub-folder with the new content upon receiving a synchronization request from the user. Alternately, the host server can download the folder/sub-folder having the new content to the mobile device at block 860. The block 860 option may be implemented based on user preference.

In one embodiment, the host server may not differentiate between new content and changed content, in which case, blocks 845 and 855 and blocks 850 and 860 may be consolidated. At decision block 840, if the host server determines that there is no changed or new content, the host server skips the synchronization operation at block 865.

FIGS. 9A-F depict example screenshots of the user interface of a mobile application used for selecting folders, sub-folders and/or files therein in a collaboration platform for offline access via the mobile device.

Figure 9B:
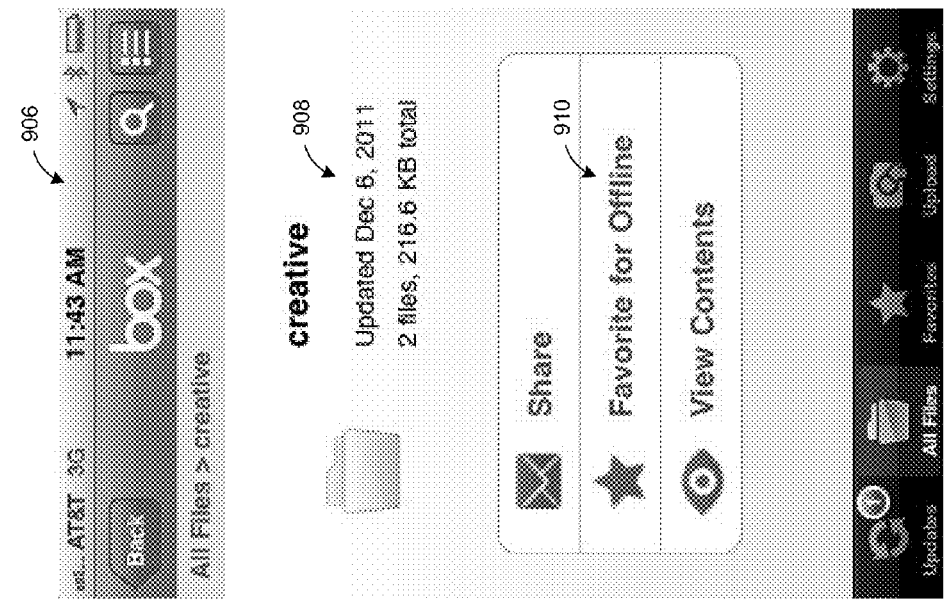
FIGS. 9A-F depict example screenshots of the user interface of a mobile application used for selecting folders, sub-folders and/or files therein in a collaboration platform for offline access via the mobile device.
Figure 9A:
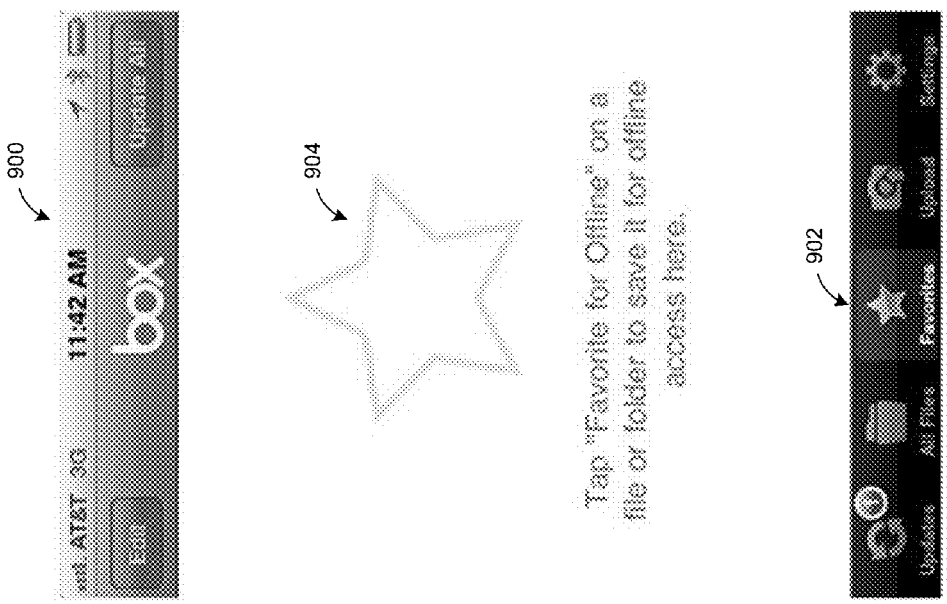
Figure 9D:
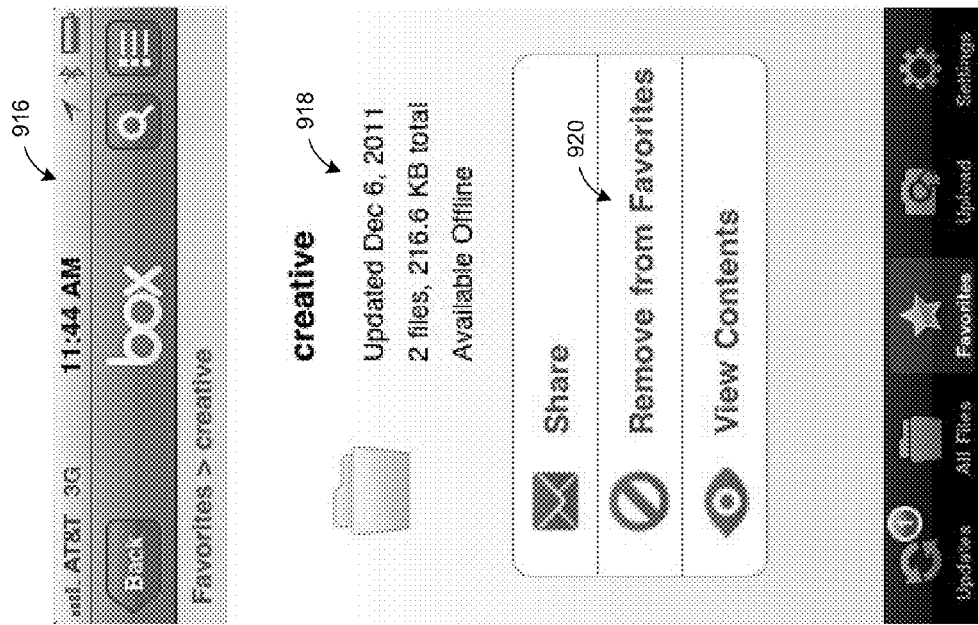
Figure 9C:
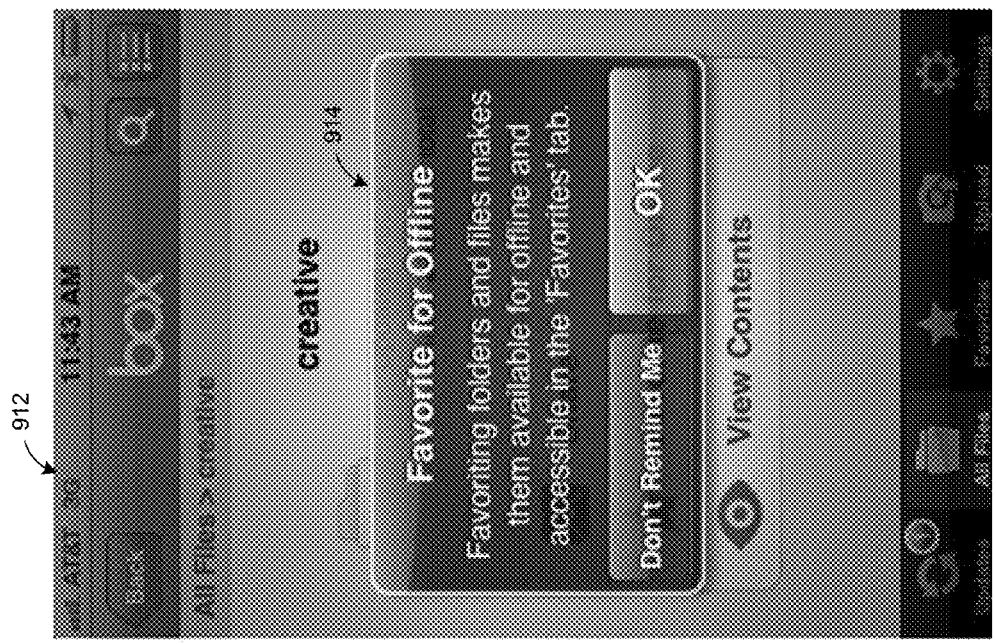
Figure 9F:
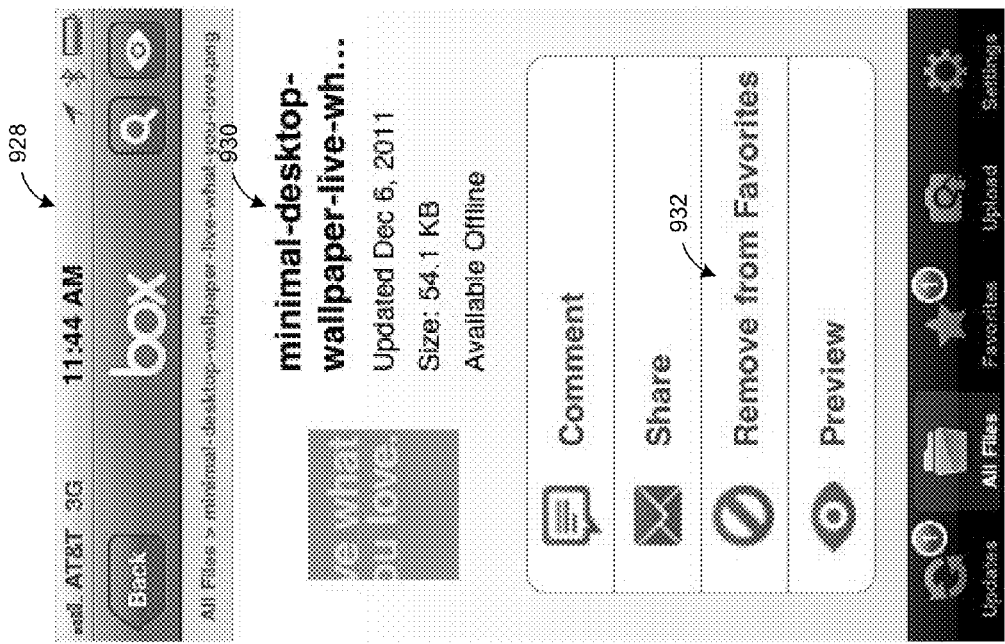
Figure 9E:
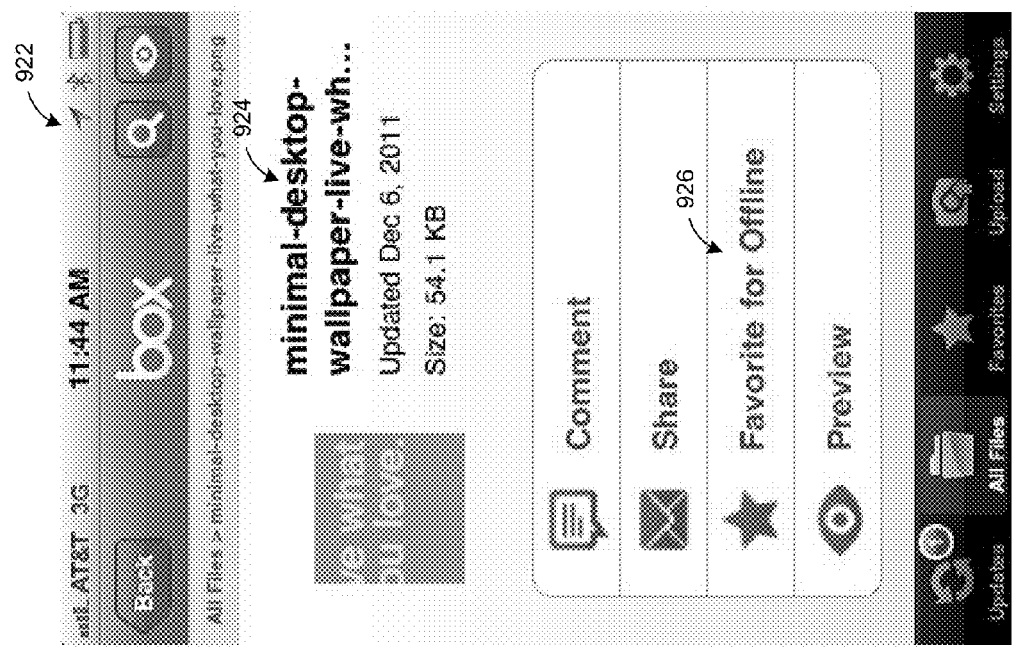

For example, user interface 900 of FIG. 9A is depicted when the 'Favorites' icon 902 is selected from the tab bar. The user interface 900 includes a display area 904 that is populated with the files and/or folders when a user selects the files and/or folders for offline access. User interface 906 of FIG. 9B, for example, is displayed when a user navigates to a folder. The user interface 906 allows the user to select the folder 908 (e.g., the 'creative' folder) for offline access. The user can select 'Favorite for Offline' item 910 on the grouped table to select the folder for offline access and syncing. The example user interface 912 of FIG. 9C including the alert 914 is displayed following selection of the item 910 from user interface 906. The alert 914 provides information regarding favoriting or designating as favorite folders and files to make them available for offline access in the "favorites" tab. The user interface 916 of FIG. 9D displays the folder 918 and details concerning the folder such as the updated date, number and size of files therein, and "available offline" status information. The user interface 916 includes a modified grouped table that displays 'Remove from Favorites' item 920 that can be selected by the user to deselect the folder 918 as an offline item. Similarly, user interface 922 of FIG. 9E displays a selected file 924 and an option for the user to favorite the file 924 for offline access by selecting the item 926 from the grouped table. User interface 928 of FIG. 9F displays a selected file 930 that is available offline, and an option to remove the file from being available offline by selecting item 932 from the grouped table.

When files or folders are selected (e.g., 'favorited') for offline access, the mobile application can automatically synchronize the file or contents of the selected folders with or without prompting the user when in the presence of a network connection (e.g., cellular or Wifi). This process can be performed automatically such that the file/folder is available and is updated when the user next accesses them.

Figures 10A, 10B:
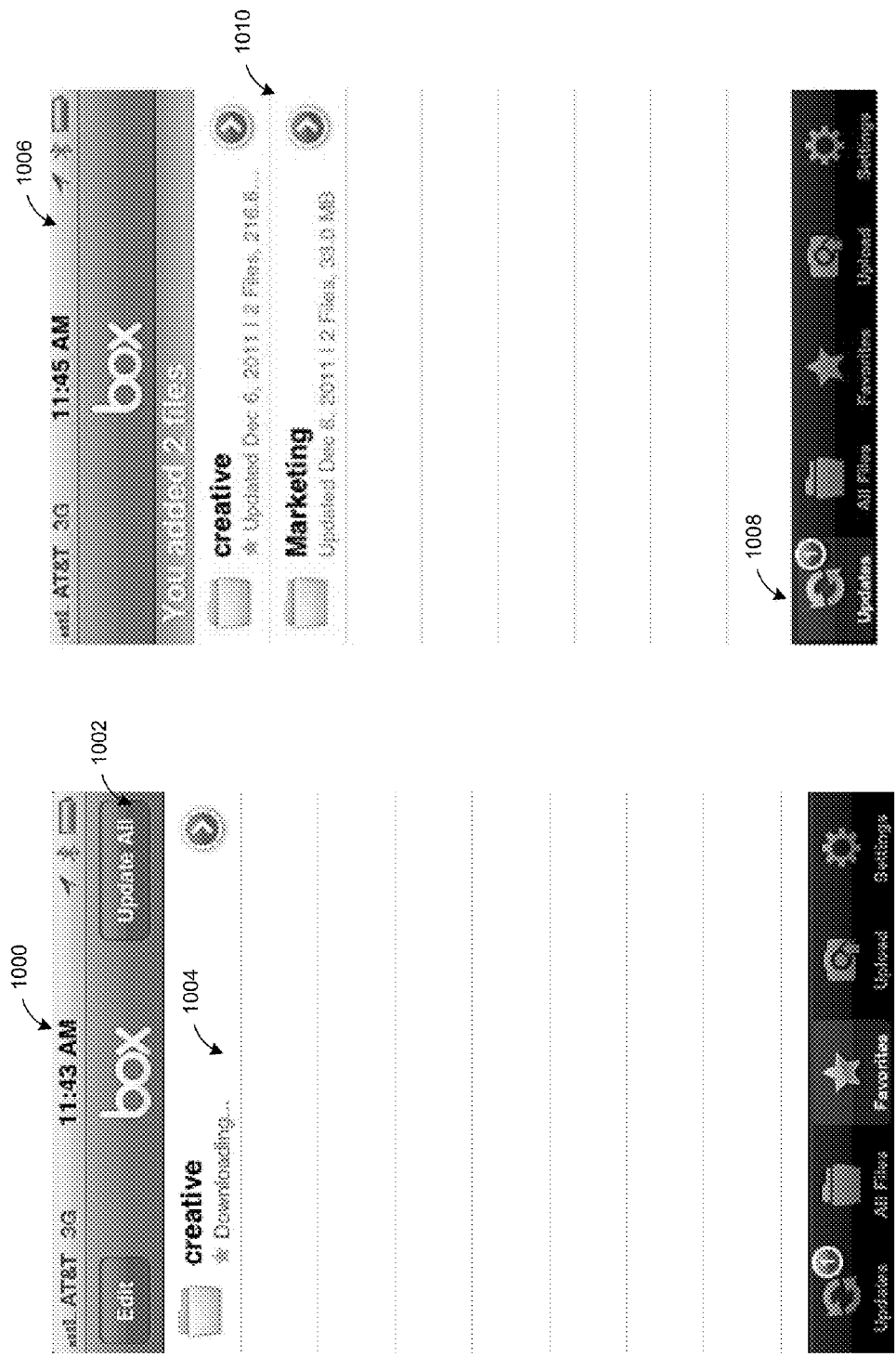
FIGS. 10A-C depict example screenshots of the user interface of a mobile application used for synchronizing and accessing files and folders.
Figure 10C:

FIGS. 10A-C depict example screenshots of the user interface of a mobile application used for synchronizing and accessing files and folders. For example, the user can select folders in the collaboration platform for access on the mobile device using the mobile application. User interface 1000 of FIG. 10A depicts a folder 1004 which has been selected for offline access and is being downloaded (including the contents in the folder) such that the user can view, access, edit or perform other operations on the content while offline or share the content with other users. When "update all" button 1002 is selected, the user interface 1006 of FIG. 10B is displayed. The selection of the "update all" button 1002 causes the view to change to that of the update tab 1008, and triggers updating of all folders and files 1010, including the ones that are favorited, that have changed or have new content.

FIG. 10C depicts another example user interface 1012 that displays the folders and files available offline under the Favorites tab, and an indication next to each item to notify the user whether or not a new version of the item is available for download. For example, folder 1014 has no update available and only the last download or synchronization date is displayed. For file 1016, however, an indication that a new version is available is displayed. The user may select option 1016 or update all to download the new version of the file.

Figures 11A, 11B:
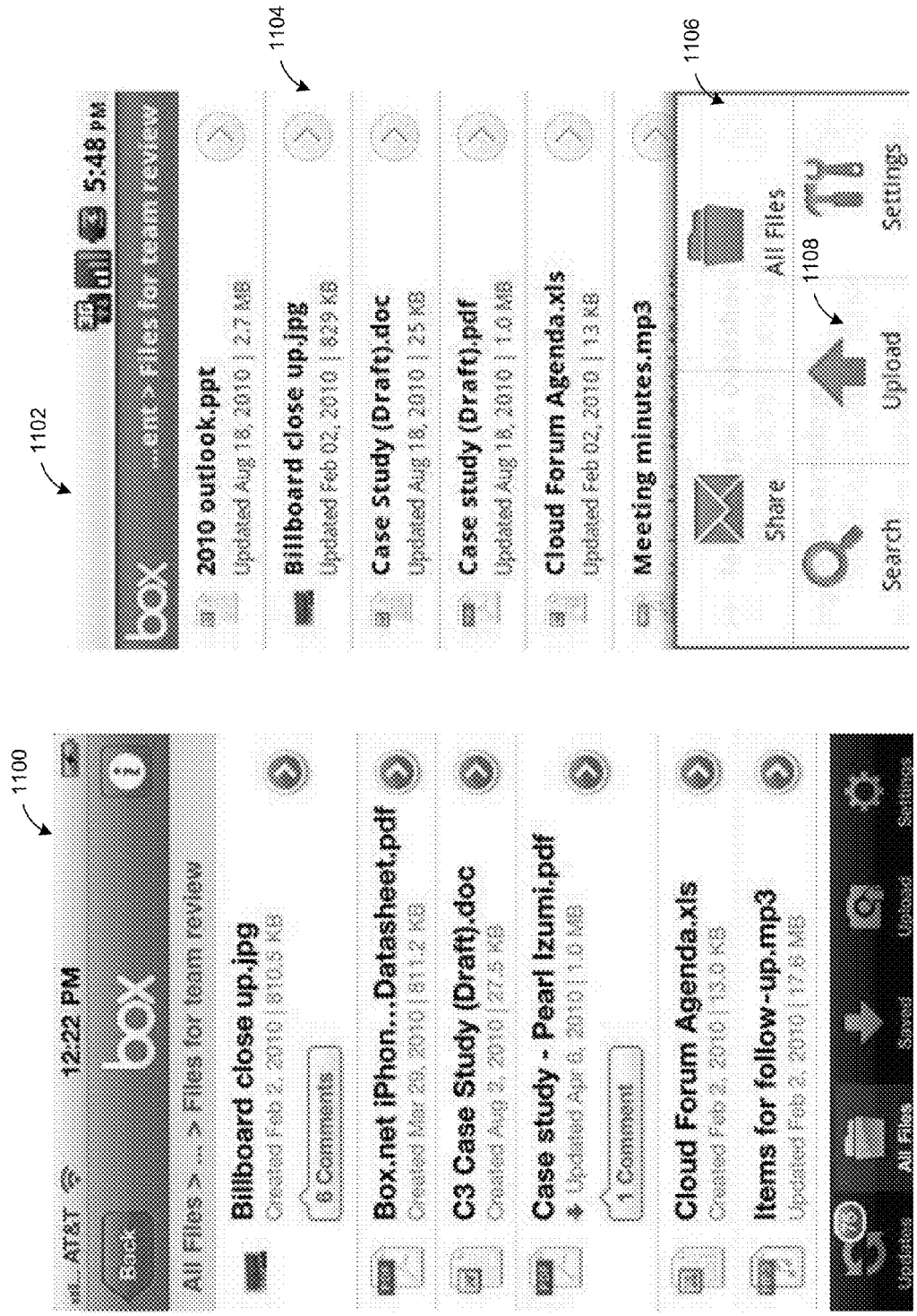
FIGS. 11A-C depict additional example screenshots of the user interface of the mobile application used to access a web-based collaboration platform on a mobile device.
Figure 11C:

FIGS. 11A-C depict additional example screenshots of the user interface of the mobile application used to access a web-based collaboration platform on a mobile device. For example, the mobile application for the collaboration platform can be used to preview content, comment on content, share content or save content for offline access. The user can also select folders and files in the collaboration platform for offline access on the mobile device using the mobile application, view folders and files that are available offline, identify and upload for syncing folders and files updated on the mobile device, update offline folders and files, and the like. For example, user interface 1100 of FIG. 11A displays a list of all files in a selected folder. The list includes information on the files such as the file name, the time stamp (i.e., the date the file was created or updated), availability of the file for offline access (i.e., saved or favorited file), comments, and the like. User interface 1102 of FIG. 11B displays a list of files 1104 in a folder or a sub-folder, along with the time stamp information. The user interface also displays a tab bar 1106 that includes an upload option 1108 to upload one or more of the files to the host server. User interface 1110 of FIG. 11C displays a list of sub-folders within a folder. Also displayed at the sub-folder level is an update available indication. For example, sub-folders 1114 and 1116 are identified as having update available, while sub-folder 1118 and file 1120 do not have any update available. A user can select the "update offline files now" option 1112 to synchronize the offline files with the host server.

Figure 12B:
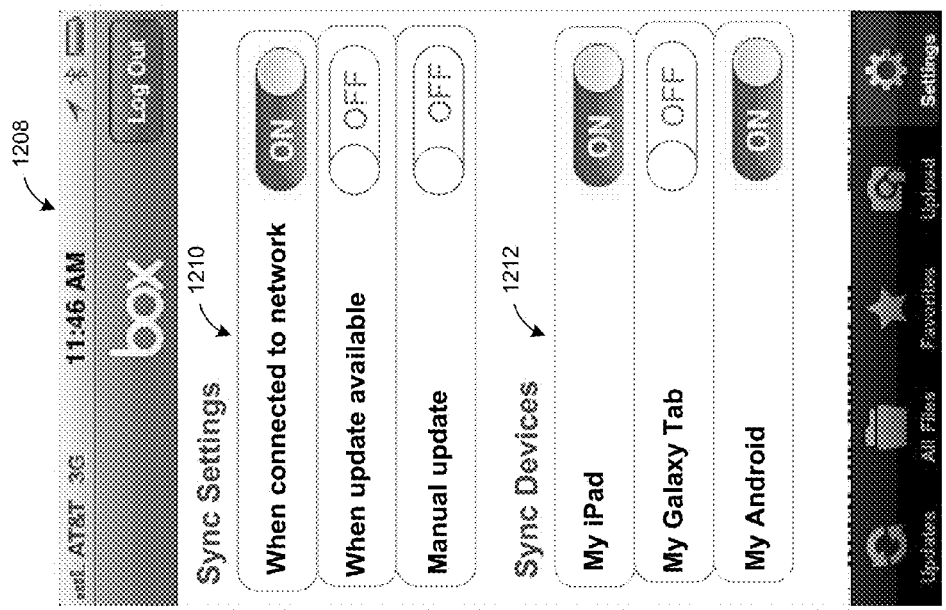
FIGS. 12A-C depict additional example screenshots of the user interface of the mobile application used to access a collaboration platform for configuring various settings and for creating or uploading content to be shared with other users.
Figure 12A:
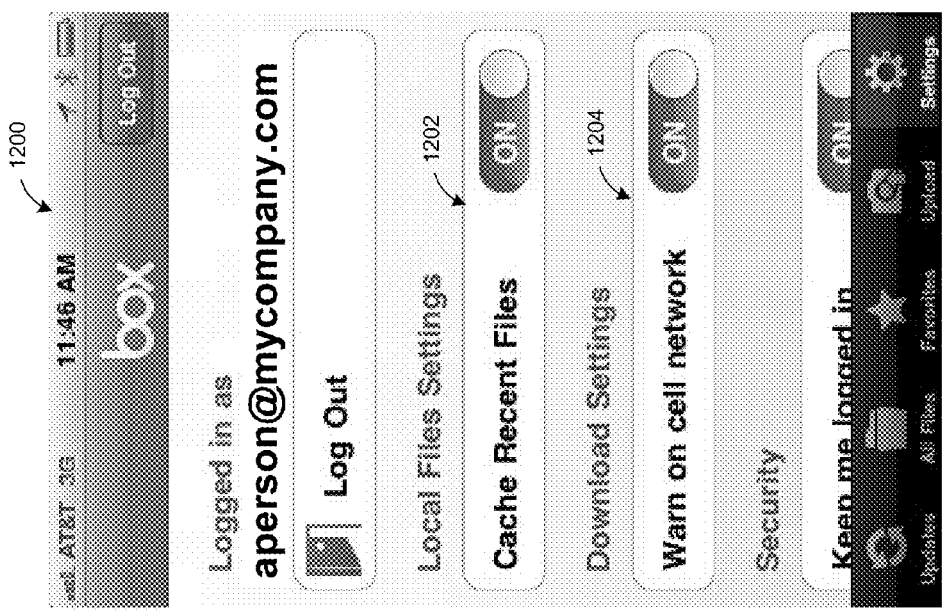
Figure 12C:
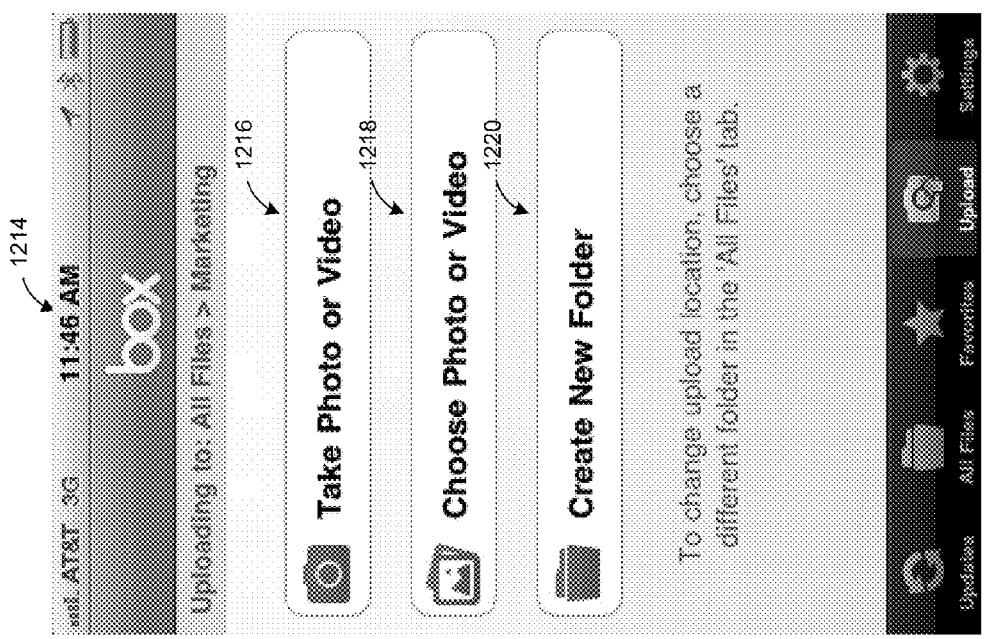

FIGS. 12A-C depict additional example screenshots of the user interface of the mobile application used to access a collaboration platform for configuring various settings and for creating or uploading content to be shared with other users. For example, user interface 1200 of FIG. 12A depicts preference and settings for the mobile application for accessing files and folders of the collaboration platform. For example, the user interface includes local file settings 1202 for turning on or off caching of recent files. When caching is turned on, it may not be necessary to perform a synchronization when the user desires to favorite files that are stored in the cache. The user interface also includes download settings 1204 for turning on or off warning when downloading on a cell network. User interface 1208 of FIG. 12B displays additional settings that may be configured by the user for syncing. For example, sync settings 1210 may be used to specify when synchronization should be performed. Some example options for triggering a synchronization with the host server include syncing when connected to the network, when an update is available and manually. User interface 1208 can also allow the user to specify the devices for syncing. For example, in the sync devices setting 1212, the user can select one or more devices as sync devices. All of the synchronization devices can then be simultaneously synced with the host server and with each other, without the user having to take an action from each device. User interface 1214 of FIG. 12C provides various mechanisms for a user to create new folders or sub-folders in the collaboration platform using item 1220, to generate/create new content to be shared or uploaded using item 1216, or to upload existing content on the mobile device to the collaboration platform, for sharing, editing, viewing, previewing, collaboration, and the like using item 1218 for example.

FIGS. 13A-E depict example screenshots of the user interface of a mobile application used to access a web-based collaboration platform on a tablet device. For example, through the mobile application on the tablet device, a user can access files and folders of the web-based collaboration platform, save selected files, sub-folders and folders for offline access, synchronize files, sub-folders and folders, upload updated, new or related files, sub-folders and folders from the mobile application, and the like.

Figure 13A:
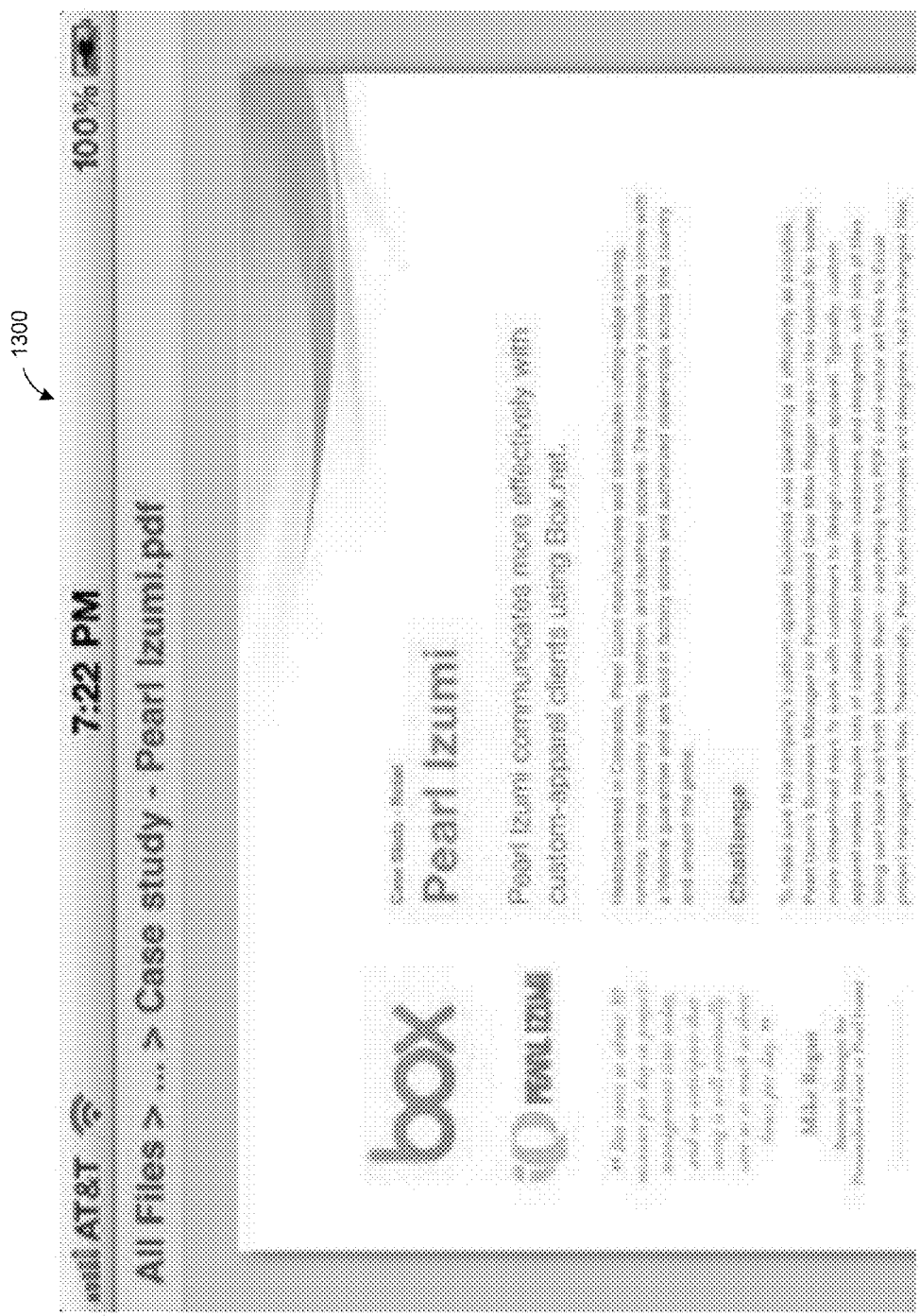
FIGS. 13A-E depict example screenshots of the user interface of a mobile application used to access a web-based collaboration platform on a tablet device.
Figure 13B:
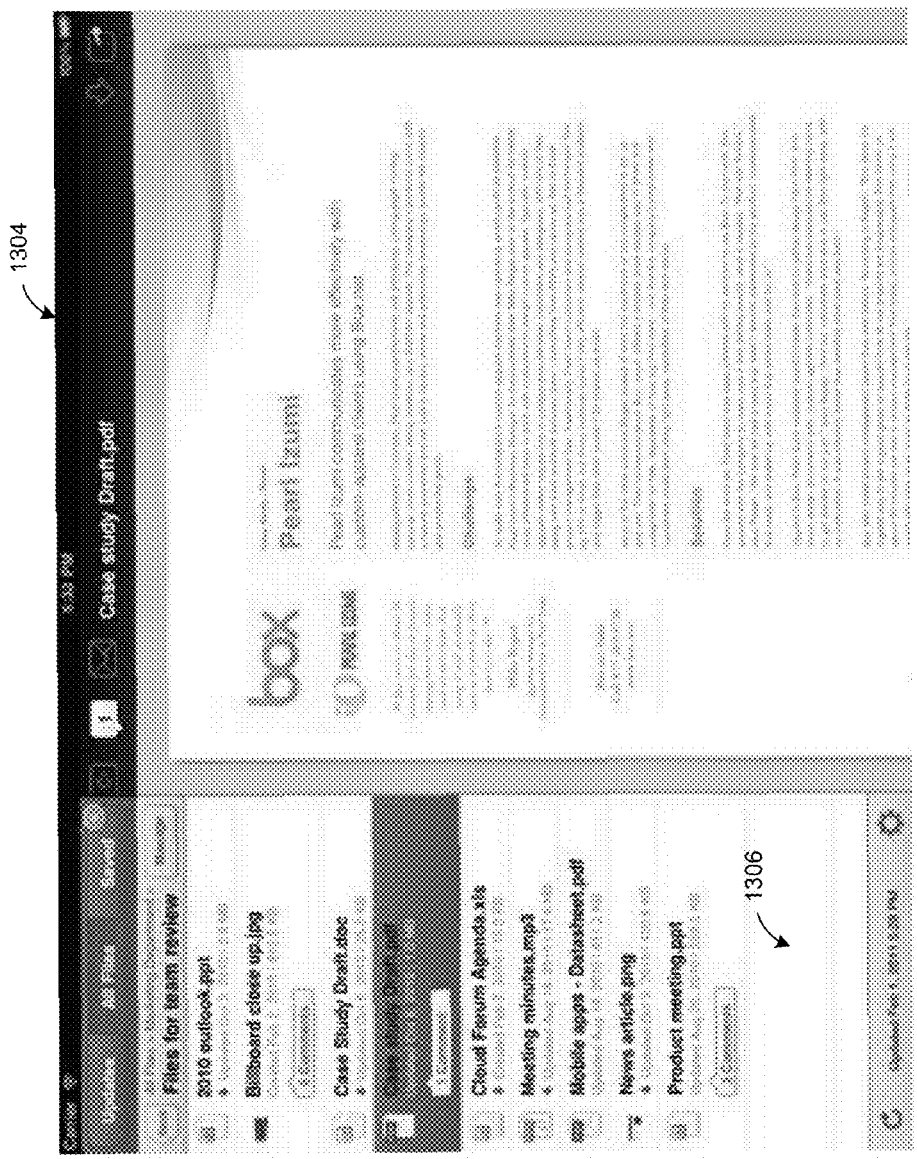
Figure 13C:
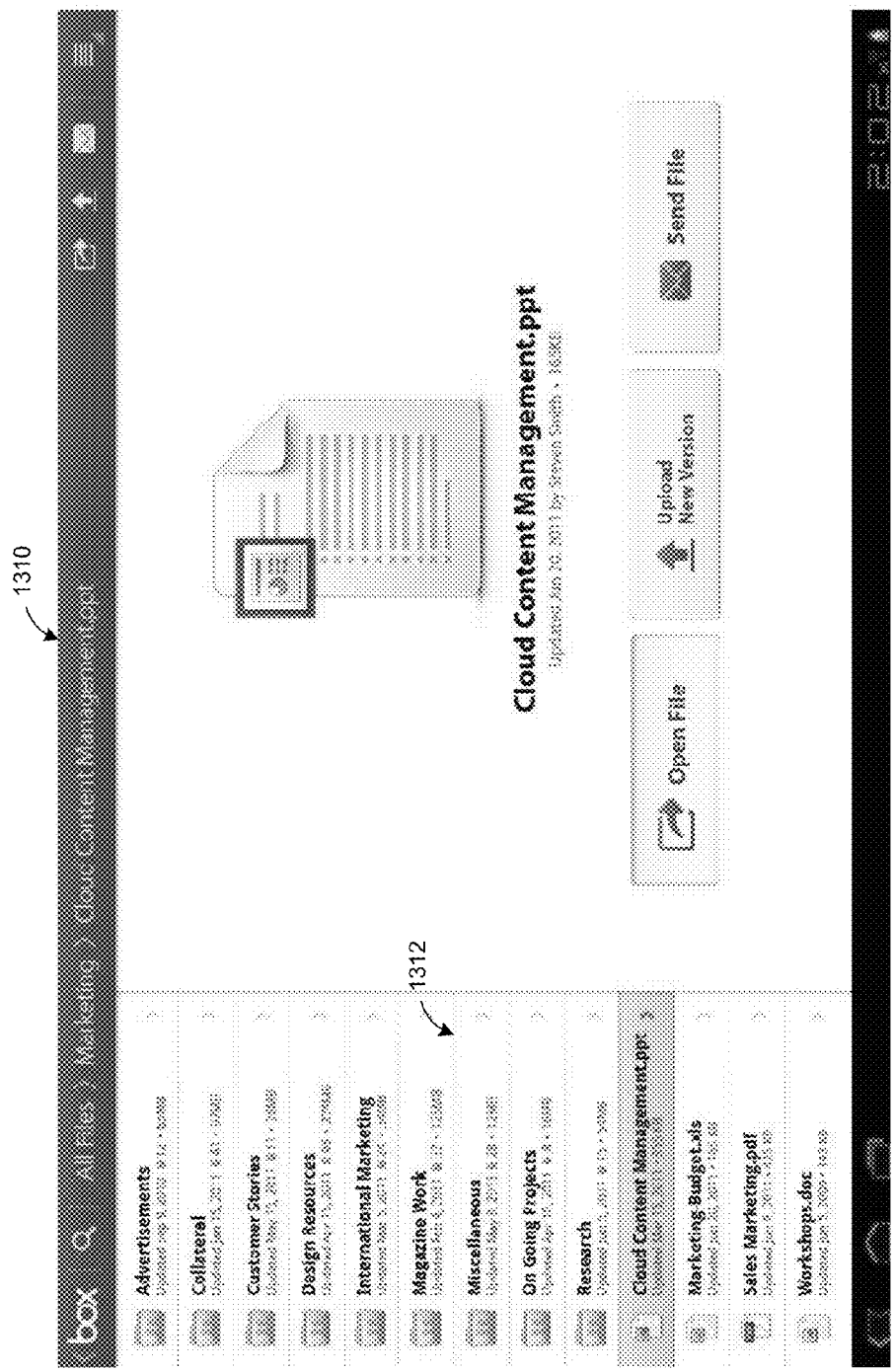
Figure 13D:
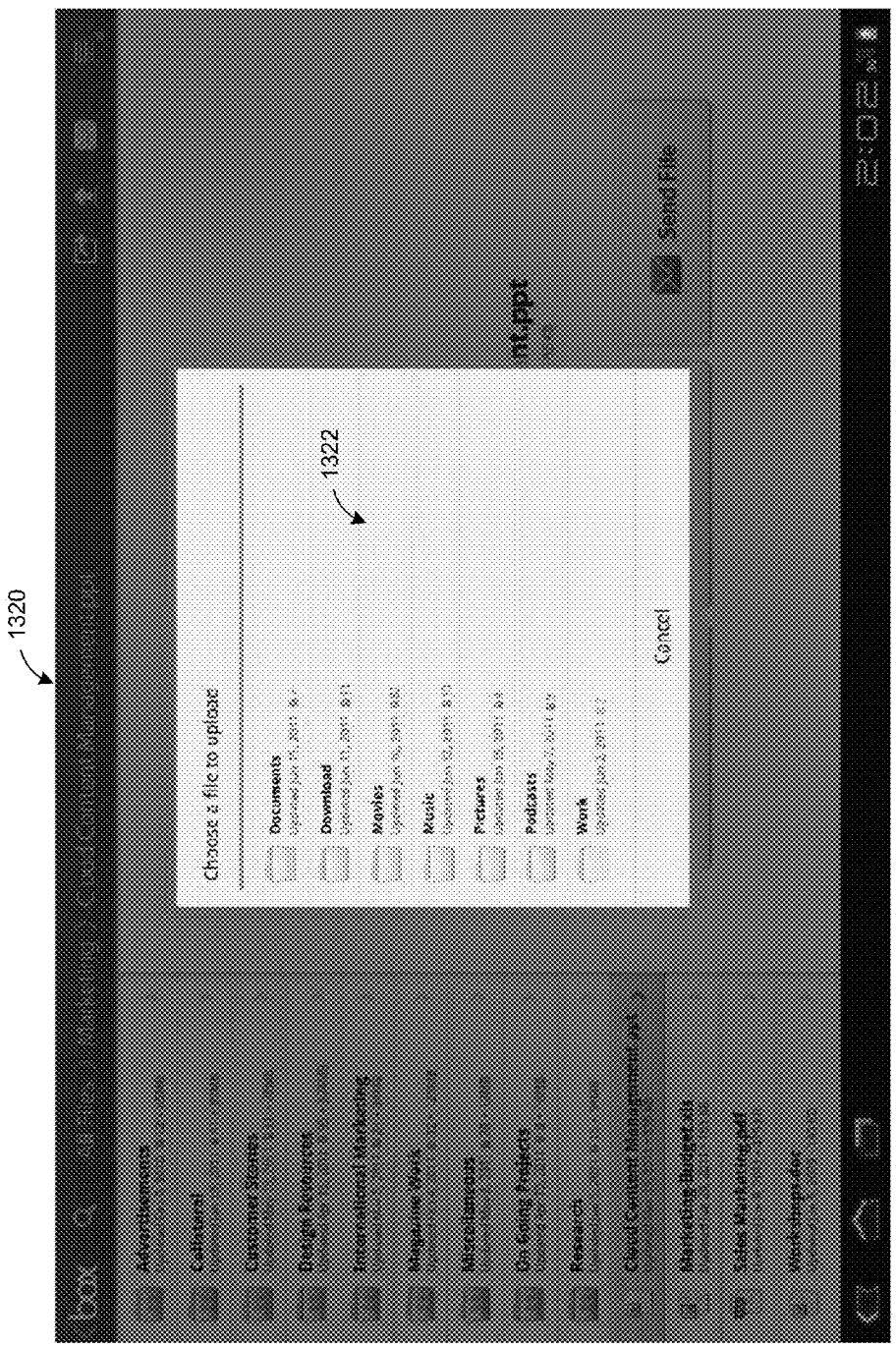
Figure 13E:
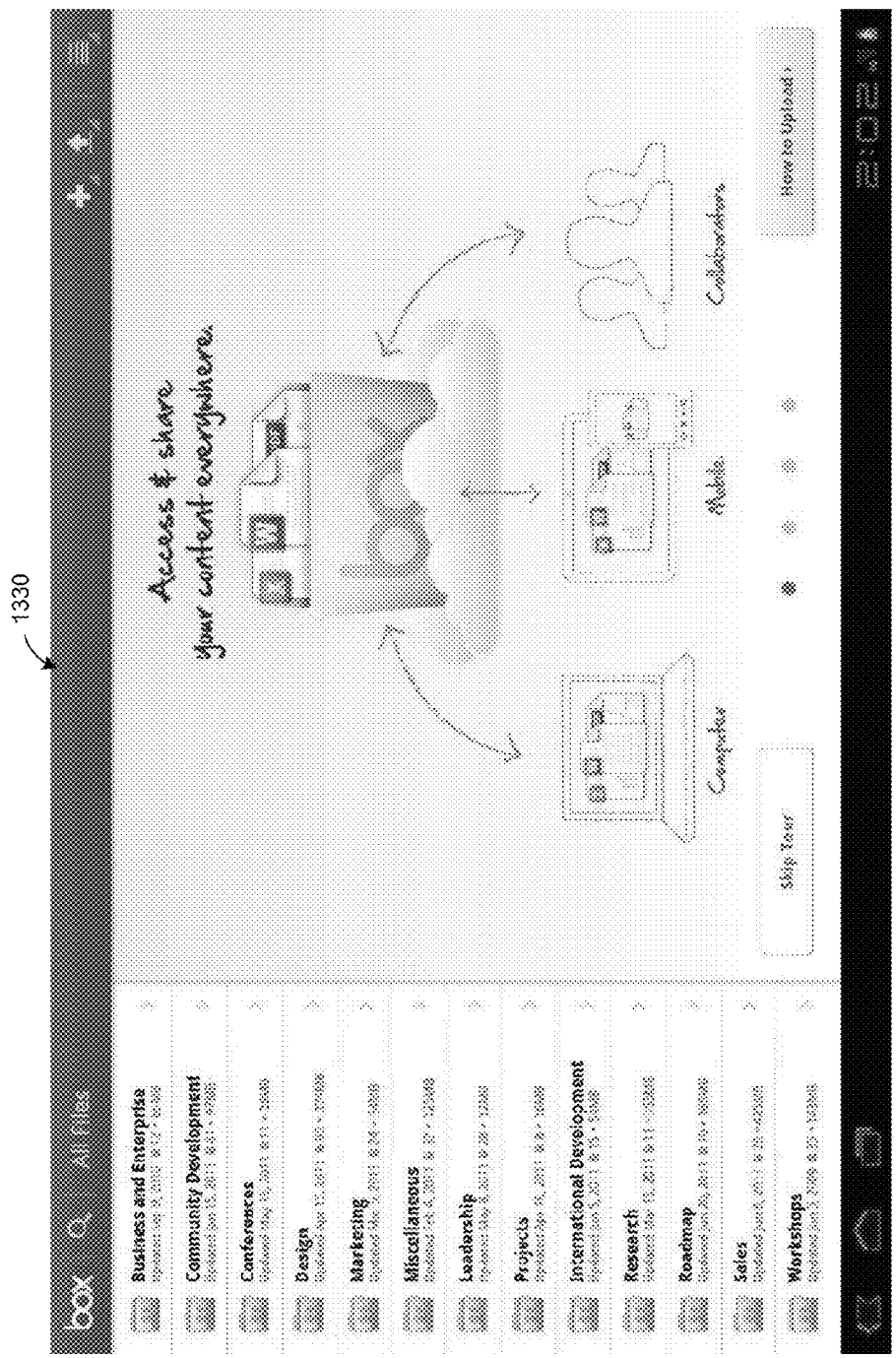

For example, user interface 1300 of FIG. 13A depicts previewing of a file using the mobile application for web-based collaboration platform on a tablet device. User interface 1304 of FIG. 13B displays a split screen view where a side panel 1306 depicts a list of files in the same folder or sub-folder as the file being previewed on the viewing area. Via the side panel 1306, users can check for and get updates from the host server and view any files and/or folders saved for offline access. User interface 1310 of FIG. 13C depicts another split screen view where a list of sub-folders and files within a folder ("Marketing") is displayed on the side panel 1312. A user can select any file or sub-folder from the side panel 1312, and perform actions such as opening the file or sub-folder, uploading a new version if one is available, emailing the file or sub-folder, and the like. User interface 1320 of FIG. 13D depicts a pop over 1322 that displays a list of folders that have been updated but not synced for syncing via an upload to the host server. User interface 1330 of FIG. 13E provides an overview of the mobile application for accessing a web-based collaboration platform, such as syncing of content at the folder and sub-folder level with multiple devices such as a computer and mobile devices, and sharing synced content with other users or collaborators.

Figure 14:
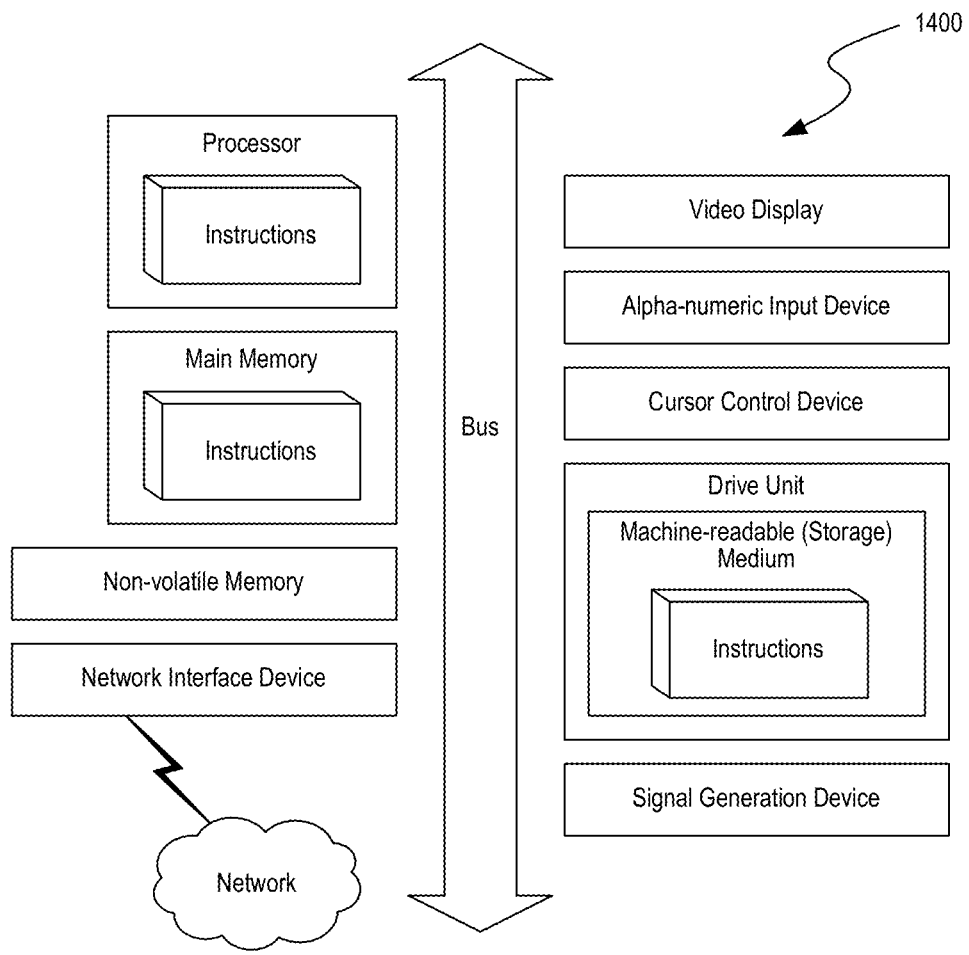
FIG. 14 shows a diagrammatic representation of a machine in the example form of a computer system within which a set of instructions, for causing the machine to perform any one or more of the methodologies discussed herein, may be executed.

FIG. 14 shows a diagrammatic representation of a machine 1400 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

I claim:

1. A computer-implemented method of providing content items of cloud-based collaboration platform for offline access on a mobile device, comprising:

receiving a selection of one or more folders or sub-folders for offline access by a first user;

determining a synchronization status of each of the one or more folders or sub-folders identified in the selection;

determining that the first user is permitted offline access to the one or more folders or sub-folders based on identifying a pre-selected subset of access rules, selected by a second user, for performing a plurality of actions, wherein the pre-selected subset of access rules determine whether the each of the one or more folders or sub-folders can be accessed or modified;

in response to identifying that any of the one or more folders or sub-folders for offline access has an out of date synchronization status:

establishing a network connection between a host server and the mobile device;

synchronizing each folder or sub-folder having the out of date synchronization status between the host server and the mobile device; and in response to identifying that each of the one or more folders or sub-folders for offline access has a current synchronization status:

assigning an offline access status to the each of the one or more folders or sub-folders, wherein the offline access status indicates that the each of the one or more folders or sub-folders is available for offline access;

updating content metadata of the each of the one or more folders or sub-folders, wherein the content metadata includes the offline access status of the each of the one or more folders or subfolders and the pre-selected subset of access rules corresponding to the each of the one or more folders or sub-folders; and preventing synchronization of any of the one or more folders or sub-folders that are assigned the offline access status.

2. The method of claim 1, further comprising:
in response to identifying that any of the one or more folders or sub-folders for offline access is out of date, sending to the mobile device an update available notification for each folder or sub-folder for offline access that is out of date.

3. The method of claim 2, further comprising:
downloading to the mobile device updated folder or sub-folder in response to a request from the mobile device.

4. The method of claim 1, wherein the synchronizing includes downloading to the mobile device or uploading to the host server any of the one or more folders or sub-folders having the out of date synchronization status.

5. The method of claim 2, wherein determining the synchronization status includes:
comparing time stamp data for each folder or sub-folder stored in the mobile device with time stamp data for the corresponding folder or sub-folder stored in the host server of the cloud-based platform to determine if the folder or sub-folder on the mobile device or the host server is out of date.

6. The method of claim 1, wherein the selection of one or more folders or sub-folders for offline access is received from a client device different from the mobile device with which the host server is synchronized.

7. The method of claim 6, wherein the mobile device includes at least one of a tablet and a smart phone, and wherein the client device includes at least one of a computer, a tablet and a smart phone.

8. The method of claim 1, wherein each folder includes at least one file or a sub-folder, and wherein each sub-folder includes at least one file.

9. The method of claim 2, wherein the update available notification for each folder or sub-folder that is out of date includes hierarchy information that is used by the mobile device to display the update available notification on a folder or sub-folder one level above the out of date folder or sub-folder.

10. The method of claim 1, wherein the one or more folders or sub-folders provided for offline access are collaborated folders or sub-folders.

11. The method of claim 1, further comprising:
receiving from the mobile device an updated folder or sub-folder having offline access status for synchronizing with the host server.

12. The method of claim 11, further comprising:
determining whether synchronizing of the updated folder or sub-folder received from the mobile device generates a conflict.

13. The method of claim 12, further comprising:
if the synchronizing of the updated folder or sub-folder received from the mobile device generates a conflict, notifying the mobile device of the conflict and postponing the synchronizing.

14. The method of claim 13, further comprising:
if the synchronizing of the updated folder or sub-folder received from the mobile device generates a conflict, assigning the updated folder or sub-folder a conflict status;
automatically storing the updated folder or sub-folder as a new version; and
sending a notification of conflict to the mobile device.

15. The method of claim 1, wherein the pre-selected subset of access rules are used to restrict other users or collaborators from modifying the one or more folders or sub-folders stored on the host server.

16. The method of claim 1, wherein the pre-selected subset of access rules are used to allow other users or collaborators read access to the one or more folders or sub-folders and access to comment on the one or more folders or sub-folders.

17. A mobile device for providing folders or sub-folders of cloud-based collaboration platform for offline access, comprising:
a memory;
a processor in communication with the memory, and configured to execute instructions to:
receive a selection of one or more folders or sub-folders for offline access by a first user;
determine a synchronization status of each of the one or more folders or sub-folders identified in the selection;
in response to identifying that any of the one or more folders or sub-folders for offline access has an out of date synchronization status:
establish a network connection between a host server and the mobile device;
synchronize each folder or sub-folder having out of date synchronization status between the host server and the mobile device;
in response to identifying that each of the one or more folders or sub-folders for offline access has a current synchronization status:
assign an offline access status to the each of the one or more folders or sub-folders to the first user based on identifying a pre-selected subset of access rules, selected by a second user, for performing a plurality of actions including modification of the one or more folders or sub-folders, wherein the offline access status indicates that the each of the one or more folders or sub-folders is available for offline access, wherein the pre-selected subset of access rules determine whether the each of the one or more folders or sub-folders can be accessed or modified;
update content metadata of the each of the one or more folders or sub-folders, wherein the content metadata includes the offline access status of the each of the one or more folders or subfolders and the pre-selected subset of access rules corresponding to the each of the one or more folders or sub-folders;
prevent synchronization of any of the one or more folders or sub-folders that are assigned the offline access status; and
receive selection of a folder, a sub-folder or a file having an offline access status to remove the selected folder, sub-folder or file from being available for offline access.

18. A system for providing a folder or a sub-folder of cloud-based collaboration platform for offline access via a client device, comprising:
a memory storing computer-executable instructions of:

an offline manager configured to allow a first user to favorite folders or sub-folders of the cloud-based collaboration platform for offline access or modification;

wherein the first user is permitted offline access or modification rights to one or more folders or sub-folders in the favorited folders or subfolders, based on identifying a pre-selected subset of access rules, selected by a second user, for performing a plurality of actions;

a sync request manager configured to:
  in response to identifying that any of the one or more folders or sub-folders for offline access has an out of date synchronization status:
    establish a network connection between a host server and the client device;
    generate a request for syncing the favorited folders or sub-folders such that the favorited folders or sub-folders are available for offline access on the client device and
  in response to identifying that each of the one or more folders or sub-folders for offline access has a current synchronization status:
    assign an offline access status to the each of the one or more folders or sub-folders, wherein the offline access status indicates that the each of the one or more folders or sub-folders is available for offline access and
    update content metadata of the each of the one or more folders or sub-folders, wherein the content metadata includes the offline access status of the each of the one or more folders or subfolders and the pre-selected subset of access rules corresponding to the each of the one or more folders or sub-folders; and
    prevent synchronization of any of the one or more folders or sub-folders that are assigned the offline access status; and an offline change detector module configured to:
  detect modification to any of the favorited folders or sub-folders; and
  based on the detection, identify at least one modified folder or sub-folder for syncing via the sync request manager; and a processor for executing the computer-executable instructions stored in the memory.

19. The system of claim 18, wherein the memory further stores computer-executable instructions of:
a folder sync module configured to identify a folder or a sub-folder related to the favorited folders or sub-folders for syncing with the cloud-based collaboration platform.

20. The system of claim 19, wherein the offline change detector is further configured to detect modification to the related folder or sub-folder identified for synchronization.

21. The system of claim 18, wherein the memory further stores computer-executable instructions of:
an access monitoring module configured to monitor access history associated with the favorited folders or sub-folders; and
an access reporting module configured to report access history associated with the favorited folders or sub-folders.

22. The system of claim 18, wherein the memory further stores computer-executable instructions of:
an offline status module configured to accord an offline status to each favorited folder or sub-folder by modifying meta data associated with the favorited folder or sub-folder.

23. The system of claim 19, wherein the related folder or sub-folder is identified based on folder hierarchy.

24. The system of claim 19, wherein the related folder or sub-folder is identified based on an application used to access or modify any of the favorited folders or sub-folders.

25. The system of claim 18, wherein the memory further stores computer-executable instructions of:
a user preference module configured to allow a user of the client device to customize the sync request manager to generate a request for syncing on demand or automatically upon receiving a trigger from the offline change detector module.

26. The system of claim 19, wherein the memory further stores computer-executable instructions of:
a user preference module configured to allow a user of the client device to define criteria for identifying the folder or sub-folder related to the favorited folders or sub-folders.

27. The system of claim 18, wherein the client device is at least one of a computer, a smart phone and a tablet device that can access the cloud-based collaboration platform via a web browser or an application installed on the client device.

28. The system of claim 18, wherein the user favoriting the folders or sub-folders of the cloud-based collaboration platform for offline access or modification includes at least one of a user of the client device that is synced and an admin, owner of a user of a workspace within which the folders or sub-folders reside.

29. The system of claim 18, wherein the sync request manager is further configured to receive an update available notification for each favorited folder or sub-folder that is modified.

30. The system of claim 29, wherein the favorited folder or sub-folder is modified by collaborators of the favorited folder or sub-folder.

31. The system of claim 18, wherein the memory further stores computer-executable instructions of:
a folder sync module configured to sync at the folder or sub-folder level each favorited folder or sub-folder for which an update is available.

32. A non-transitory machine readable storage medium encoded with instructions for performing method of providing content items of cloud-based collaboration platform for offline access on a mobile device, the instructions configured to:
receive selection of one or more folders or sub-folders for offline access by a first user;
determine a synchronization status of each of the one or more folders or sub-folders identified in the selection;
determine that the first user is permitted offline access to the one or more folders or sub-folders based on identifying a pre-selected subset of access rules, selected by a second user, for performing a plurality of actions, wherein the pre-selected subset of access rules determine whether the one or more folders or sub-folders can be accessed or modified;
in response to identifying that any of the one or more folders or sub-folders for offline access has an out of date synchronization status:
  establish a network connection between a host server and the mobile device;

synchronize each folder or sub-folder having out of date synchronization status between the host server and the mobile device; and in response to identifying that each of the one or more folders or sub-folders for offline access has a current synchronization status:

update content metadata of the each of the one or more folders or sub-folders, wherein the content metadata includes the offline access status of the each of the one or more folders or subfolders and the preselected subset of access rules corresponding to the each of the one or more folders or sub-folders;

assign an offline access status to the one or more folders or sub-folders, wherein the offline access status indicates that the each of the one or more folders or sub-folders is available for offline access; and prevent synchronization of any of the one or more folders or sub-folders that are assigned the offline access status.

33. The method of claim 1, wherein the updating includes adding, to the content metadata, a time stamp indicative of when the each of the one or more folders or sub-folders was synchronized and made available for offline access.

\* \* \* \* \*